United States Patent
Dickens et al.

(10) Patent No.: US 12,485,240 B2
(45) Date of Patent: Dec. 2, 2025

(54) METHODS AND APPARATUS FOR MONITORING RESPIRATORY THERAPY

(71) Applicant: ResMed Pty Ltd, Bella Vista (AU)

(72) Inventors: Paul Andrew Dickens, Sydney (AU); Dion Charles Chewe Martin, Sydney (AU)

(73) Assignee: ResMed Pty Ltd (AU)

( * ) Notice: Subject to any disclaimer, the term of this patent is extended or adjusted under 35 U.S.C. 154(b) by 993 days.

(21) Appl. No.: 17/438,129

(22) PCT Filed: Apr. 9, 2020

(86) PCT No.: PCT/AU2020/050350
§ 371 (c)(1),
(2) Date: Sep. 10, 2021

(87) PCT Pub. No.: WO2020/206495
PCT Pub. Date: Oct. 15, 2020

(65) Prior Publication Data
US 2022/0160979 A1    May 26, 2022

Related U.S. Application Data

(60) Provisional application No. 62/832,091, filed on Apr. 10, 2019.

(51) Int. Cl.
*A61M 16/00* (2006.01)
*A61M 16/06* (2006.01)
*A61M 16/10* (2006.01)

(52) U.S. Cl.
CPC ...... *A61M 16/026* (2017.08); *A61M 16/0069* (2014.02); *A61M 16/0666* (2013.01);
(Continued)

(58) Field of Classification Search
CPC ............... A61M 16/003; A61M 2016/0027
See application file for complete search history.

(56) References Cited

U.S. PATENT DOCUMENTS

| 4,944,310 A | 7/1990 | Sullivan |
| 6,532,959 B1 | 3/2003 | Berthon-Jones |

(Continued)

FOREIGN PATENT DOCUMENTS

| JP | 2018507748 A | 3/2018 |
| WO | 2013020167 A1 | 2/2013 |

(Continued)

OTHER PUBLICATIONS

Office Action issued in corresponding Japanese Patent Application No. 2021-560093, mailed Sep. 1, 2023, 7 pages.
(Continued)

*Primary Examiner* — Brandy S Lee
*Assistant Examiner* — Mishal Zahra Hussain
(74) *Attorney, Agent, or Firm* — Botos Churchill IP Law LLP

(57) ABSTRACT

Apparatus, such as a respiratory therapy device 4000, may generate a signal representing an estimate of a patient breathing pattern when using a flow therapy device with an un-sealed patient interface. The device may include a blower and may generate a flow of air at a controlled flow rate. The apparatus may include a controller. The generation may involve computing an estimate of the breathing pattern as a
(Continued)

function of a device flow rate signal; a device pressure signal; a device conductance; a patient conductance; and a coupling parameter that characterizes a degree of coupling between the interface and the patients nares. An estimate of an exit pressure representative of a pressure of a flow of air generated by the therapy device just outside an orifice of the unsealed interface may also be computed. An estimate of a flushing flow rate from the estimated exit pressure may also be computed.

30 Claims, 18 Drawing Sheets

(52) U.S. Cl.
CPC ...... *A61M 16/1005* (2014.02); *A61M 16/107* (2014.02); *A61M 2016/0027* (2013.01); *A61M 2016/0039* (2013.01); *A61M 16/109* (2014.02); *A61M 16/1095* (2014.02); *A61M 2205/3334* (2013.01)

(56) References Cited

U.S. PATENT DOCUMENTS

| | | | |
|---|---|---|---|
| 7,866,944 | B2 | 1/2011 | Kenyon et al. |
| 8,636,479 | B2 | 1/2014 | Barton et al. |
| 8,638,014 | B2 | 1/2014 | David |
| 8,733,349 | B2 | 5/2014 | Bath et al. |
| 2005/0121033 | A1 | 6/2005 | Starr et al. |
| 2017/0087316 | A1* | 3/2017 | White ............... A61M 16/0057 |
| 2018/0169361 | A1* | 6/2018 | Dennis ................ A61M 16/16 |

FOREIGN PATENT DOCUMENTS

| | | |
|---|---|---|
| WO | 2015033288 A1 | 3/2015 |
| WO | 2015120521 A1 | 8/2015 |
| WO | 2016145483 A1 | 9/2016 |
| WO | 2017096428 A1 | 6/2017 |
| WO | 2020037361 A1 | 2/2020 |
| WO | 2020037375 A1 | 2/2020 |

OTHER PUBLICATIONS

Office Action from corresponding EP Application No. 20 787 742.4 dated Dec. 2, 2022.
PCT Notification of Transmittal of the International Search Report and the Written Opinion of the International Search Authority, of the Declaration mailed Jun. 25, 2020.
West, John B., "Respiratory Physiology", Lippincott Williams & Wilkins, 9th Edition published 2012.
Office Action issued in corresponding European Patent Application No. 20787742.4, mailed Aug. 4, 2025, 4 pages.

* cited by examiner

METHODS AND APPARATUS FOR MONITORING RESPIRATORY THERAPY

1 CROSS-REFERENCE TO RELATED APPLICATIONS

The present application is a national phase entry under 35 U.S.C. § 371 of International Application No. PCT/AU2020/050350 filed Apr. 9, 2020, published in English, which claims priority from U.S. Provisional Patent Application No. 62/832,091 filed Apr. 10, 2019, all of which are incorporated herein by reference.

2 BACKGROUND OF THE TECHNOLOGY

2.1 Field of the Technology

The present technology relates to one or more of the screening, diagnosis, monitoring, treatment, prevention and amelioration of respiratory-related disorders. The present technology also relates to medical devices or apparatus, and their use.

2.2 Description of The Related Art

2.2.1 Human Respiratory System and its Disorders

The respiratory system of the body facilitates gas exchange. The nose and mouth form the entrance to the airways of a patient.

The airways include a series of branching tubes, which become narrower, shorter and more numerous as they penetrate deeper into the lung. The prime function of the lung is gas exchange, allowing oxygen to move from the inhaled air into the venous blood and carbon dioxide to move in the opposite direction. The trachea divides into right and left main bronchi, which further divide eventually into terminal bronchioles. The bronchi make up the conducting airways, and do not take part in gas exchange. Further divisions of the airways lead to the respiratory bronchioles, and eventually to the alveoli. The alveolated region of the lung is where the gas exchange takes place, and is referred to as the respiratory zone. See "*Respiratory Physiology*", by John B. West, Lippincott Williams & Wilkins, 9th edition published 2012.

A range of respiratory disorders exist. Certain disorders may be characterised by particular events, e.g. apneas, hypopneas, and hyperpneas.

Examples of respiratory disorders include Obstructive Sleep Apnea (OSA), Cheyne-Stokes Respiration (CSR), respiratory insufficiency, Obesity Hyperventilation Syndrome (OHS), Chronic Obstructive Pulmonary Disease (COPD), Neuromuscular Disease (NMD) and Chest wall disorders.

Obstructive Sleep Apnea (OSA), a form of Sleep Disordered Breathing (SDB), is characterised by events including occlusion or obstruction of the upper air passage during sleep. It results from a combination of an abnormally small upper airway and the normal loss of muscle tone in the region of the tongue, soft palate and posterior oropharyngeal wall during sleep. The condition causes the affected patient to stop breathing for periods typically of 30 to 120 seconds in duration, sometimes 200 to 300 times per night. It often causes excessive daytime somnolence, and it may cause cardiovascular disease and brain damage. The syndrome is a common disorder, particularly in middle aged overweight males, although a person affected may have no awareness of the problem. See U.S. Pat. No. 4,944,310 (Sullivan).

Cheyne-Stokes Respiration (CSR) is another form of sleep disordered breathing. CSR is a disorder of a patient's respiratory controller in which there are rhythmic alternating periods of waxing and waning ventilation known as CSR cycles. CSR is characterised by repetitive de-oxygenation and re-oxygenation of the arterial blood. It is possible that CSR is harmful because of the repetitive hypoxia. In some patients CSR is associated with repetitive arousal from sleep, which causes severe sleep disruption, increased sympathetic activity, and increased afterload. See U.S. Pat. No. 6,532,959 (Berthon-Jones).

Respiratory failure is an umbrella term for respiratory disorders in which the lungs are unable to inspire sufficient oxygen or exhale sufficient $CO_2$ to meet the patient's needs. Respiratory failure may encompass some or all of the following disorders.

A patient with respiratory insufficiency (a form of respiratory failure) may experience abnormal shortness of breath on exercise.

Obesity Hyperventilation Syndrome (OHS) is defined as the combination of severe obesity and awake chronic hypercapnia, in the absence of other known causes for hypoventilation. Symptoms include dyspnea, morning headache and excessive daytime sleepiness.

Chronic Obstructive Pulmonary Disease (COPD) encompasses any of a group of lower airway diseases that have certain characteristics in common. These include increased resistance to air movement, extended expiratory phase of respiration, and loss of the normal elasticity of the lung. Examples of COPD are emphysema and chronic bronchitis. COPD is caused by chronic tobacco smoking (primary risk factor), occupational exposures, air pollution and genetic factors. Symptoms include: dyspnea on exertion, chronic cough and sputum production.

Neuromuscular Disease (NMD) is a broad term that encompasses many diseases and ailments that impair the functioning of the muscles either directly via intrinsic muscle pathology, or indirectly via nerve pathology. Some NMD patients are characterised by progressive muscular impairment leading to loss of ambulation, being wheelchair-bound, swallowing difficulties, respiratory muscle weakness and, eventually, death from respiratory failure. Neuromuscular disorders can be divided into rapidly progressive and slowly progressive: (i) Rapidly progressive disorders: Characterised by muscle impairment that worsens over months and results in death within a few years (e.g. Amyotrophic lateral sclerosis (ALS) and Duchenne muscular dystrophy (DMD) in teenagers); (ii) Variable or slowly progressive disorders: Characterised by muscle impairment that worsens over years and only mildly reduces life expectancy (e.g. Limb girdle, Facioscapulohumeral and Myotonic muscular dystrophy). Symptoms of respiratory failure in NMD include: increasing generalised weakness, dysphagia, dyspnea on exertion and at rest, fatigue, sleepiness, morning headache, and difficulties with concentration and mood changes.

Chest wall disorders are a group of thoracic deformities that result in inefficient coupling between the respiratory muscles and the thoracic cage. The disorders are usually characterised by a restrictive defect and share the potential of long term hypercapnic respiratory failure. Scoliosis and/or kyphoscoliosis may cause severe respiratory failure. Symptoms of respiratory failure include: dyspnea on exertion, peripheral oedema, orthopnea, repeated chest infections, morning headaches, fatigue, poor sleep quality and loss of appetite.

A range of therapies have been used to treat or ameliorate such conditions. Furthermore, otherwise healthy individuals may take advantage of such therapies to prevent respiratory disorders from arising. However, these have a number of shortcomings.

2.2.2 Therapies

Various respiratory therapies, such as Continuous Positive Airway Pressure (CPAP) therapy, Non-invasive ventilation (NIV), Invasive ventilation (IV), and High Flow Therapy (HFT) have been used to treat one or more of the above respiratory disorders.

2.2.2.1 Positive Pressure Therapies

Positive pressure therapy is the application of a supply of air to an entrance to the airways at a controlled target pressure that is nominally positive with respect to atmosphere throughout the patient's breathing cycle (in contrast to negative pressure therapies such as the tank ventilator or cuirass).

Continuous Positive Airway Pressure (CPAP) therapy has been used to treat Obstructive Sleep Apnea (OSA). The mechanism of action is that continuous positive airway pressure acts as a pneumatic splint and may prevent upper airway occlusion, such as by pushing the soft palate and tongue forward and away from the posterior oropharyngeal wall. Treatment of OSA by CPAP therapy may be voluntary, and hence patients may elect not to comply with therapy if they find devices used to provide such therapy one or more of: uncomfortable, difficult to use, expensive and aesthetically unappealing.

Non-invasive ventilation (NIV) provides ventilatory support to a patient through the upper airways to assist the patient breathing and/or maintain adequate oxygen levels in the body by doing some or all of the work of breathing. The ventilatory support is provided via a non-invasive patient interface. NIV has been used to treat CSR and respiratory failure, in forms such as OHS, COPD, NMD and Chest Wall disorders. In some forms, the comfort and effectiveness of these therapies may be improved.

Invasive ventilation (IV) provides ventilatory support to patients that are no longer able to effectively breathe themselves and may be provided using a tracheostomy tube or endotracheal tube. In some forms, the comfort and effectiveness of these therapies may be improved.

2.2.2.2 Flow Therapies

Not all respiratory therapies aim to deliver a therapeutic pressure. Some respiratory therapies aim to deliver a prescribed respiratory volume by delivering an inspiratory flow rate profile over a targeted duration, possibly superimposed on a positive baseline pressure. In other cases, the interface to the patient's airways is 'open' (unsealed) and the respiratory therapy may supplement the patient's own spontaneous breathing with a flow of conditioned or enriched gas. In one example, High Flow therapy (HFT) is the provision of a continuous, heated, humidified flow of air to an entrance to the airway through an unsealed or open patient interface at a "treatment flow rate" that may be held approximately constant throughout the respiratory cycle. The treatment flow rate is nominally set to exceed the patient's peak inspiratory flow rate. HFT has been used to treat OSA, CSR, respiratory failure, COPD, and other respiratory disorders. One mechanism of action is that the high flow rate of air at the airway entrance improves ventilation efficiency by flushing, or washing out, expired $CO_2$ from the patient's anatomical deadspace. Hence, HFT is thus sometimes referred to as a deadspace therapy (DST). Other benefits may include the elevated warmth and humidification (possibly of benefit in secretion management) and the potential for modest elevation of airway pressures. As an alternative to constant flow rate, the treatment flow rate may follow a profile that varies over the respiratory cycle.

2.2.2.3 Supplementary Oxygen

For certain patients, oxygen therapy may be combined with a positive pressure therapy or HFT by adding supplementary oxygen to the pressurised flow of air. When oxygen is added to positive pressure therapy, this is referred to as positive pressure therapy with supplementary oxygen. When oxygen is added to HFT, the resulting therapy is referred to as HFT with supplementary oxygen.

2.2.3 Respiratory Therapy Systems

These therapies may be provided by a respiratory therapy system. Such systems may also be used to screen, diagnose, or monitor a condition without treating it.

A respiratory therapy system may comprise a Respiratory Therapy Device (RT device), an air circuit, a humidifier, and a patient interface.

2.2.3.1 Patient Interface

A patient interface may be used to interface respiratory equipment to its wearer, for example by providing a flow of air to an entrance to the airways. The flow of air may be provided via a mask to the nose and/or mouth, a tube to the mouth or a tracheostomy tube to the trachea of a patient. Depending upon the therapy to be applied, the patient interface may form a seal, e.g., with a region of the patient's face, to facilitate the delivery of gas at a pressure at sufficient variance with ambient pressure to effect therapy, e.g., at a positive pressure of about 10 $cmH_2O$ relative to ambient pressure. For flow therapies such as nasal HFT, the patient interface is configured to insufflate the nares but specifically to avoid a complete seal. One example of such a patient interface is a nasal cannula.

2.2.3.2 Respiratory Therapy (RT) Device

A respiratory therapy (RT) device such as a respiratory pressure therapy (RPT) device or respiratory flow therapy (RFT) device may be configured to generate a flow of air for delivery to an interface to the airways. The flow of air may be pressure-controlled (for positive pressure therapies such as in the case of an RPT device) or flow-controlled (for flow therapies such as HFT as in the case of an RFT device). In some cases, RPT devices may also act as flow therapy devices. Examples of RPT devices include CPAP devices and ventilators.

2.2.3.3 Air Circuit

An air circuit is a conduit or a tube constructed and arranged to allow, in use, a flow of air to travel between two components of a respiratory therapy system such as the RT device and the patient interface. In some cases, there may be separate limbs of the air circuit for inhalation and exhalation. In other cases, a single limb air circuit is used for both inhalation and exhalation.

2.2.3.4 Humidifier

Delivery of a flow of air without humidification may cause drying of airways. The use of a humidifier with an RT device and the patient interface produces humidified gas that minimizes drying of the nasal mucosa and increases patient airway comfort. In addition, in cooler climates, warm air applied generally to the face area in and about the patient interface is more comfortable than cold air. Humidifiers therefore often have the capacity to heat the flow of air was well as humidifying it.

2.2.4 Screening, Diagnosis, and Monitoring Systems

Screening and diagnosis generally describe the identification of a condition from its signs and symptoms. Screening typically gives a true/false result indicating whether or not a patient's SDB is severe enough to warrant further investigation, while diagnosis may result in clinically actionable information. Screening and diagnosis tend to be one-off processes, whereas monitoring the progress of a condition can continue indefinitely. Some screening/diagnosis systems are suitable only for screening/diagnosis, whereas some may also be used for monitoring.

HFT in the home is a therapy for moderately hypercapnic COPD patients, non-hypercapnic hypoxemic respiratory failure patients, or those for whom NW is indicated but cannot tolerate NIV. This population may also have OSA, with prevalence between 20-70% depending on the study. Other breathing issues such as hypoventilation periods or periodic breathing may also exist, with the latter being a potential side-effect of HFT itself. Therefore, offering tools to diagnose and monitor such issues during HFT may improve outcomes for the patient by enabling optimal treatment of comorbid conditions. One helpful parameter for these tasks is breathing pattern.

The sensors in a respiratory therapy system are usually located on-board the respiratory therapy device. The sensors on-board a respiratory therapy device are typically intended to measure steady-state flow rate and pressure. Monitoring patient parameters such as breathing pattern during HFT poses some additional challenges compared to monitoring during positive pressure therapy. This is due to the fact that during HFT the patient is typically coupled to the device only through a non-sealing interface (nasal cannula) and a narrow-bore air circuit of high pneumatic impedance. Consequently, variations in the patient's respiratory flow rate are only weakly reflected as oscillations on the signals sensed at the therapy device. Additionally, nasal anatomy and cannula placement within the nares both vary, imposing further uncertainty of the strength of the signals sensed at the therapy device. Respiratory signals are small oscillations on top of the steady-state signals. Under some conditions (small cannula, low respiratory flow rate) the respiratory signals can be of similar order of magnitude to the resolution of the sensors.

It would therefore be useful to provide improved apparatus and methods of estimating a patient's respiratory flow rate during HFT using signals sensed at the therapy device.

3 BRIEF SUMMARY OF THE TECHNOLOGY

The present technology is directed towards providing medical devices used in the screening, diagnosis, monitoring, amelioration, treatment, or prevention of respiratory disorders having one or more of improved comfort, cost, efficacy, ease of use and manufacturability.

A first aspect of the present technology relates to apparatus used in the screening, diagnosis, monitoring, amelioration, treatment or prevention of a respiratory disorder.

Another aspect of the present technology relates to methods used in the screening, diagnosis, monitoring, amelioration, treatment or prevention of a respiratory disorder.

Some implementations of the present technology may include a method in a controller for computing an estimate of a breathing pattern of a patient. The method may include accessing a device flow rate signal representative of a flow rate of a flow of air generated by a respiratory therapy device configured for providing a flow therapy via an unsealed patient interface. The method may include accessing a device pressure signal representative of a pressure of the flow of air generated by the respiratory therapy device. The method may include computing an estimate of an exit pressure representative of a pressure of the flow of air just outside an orifice of the unsealed patient interface with a first function of (a) the device pressure signal, (b) the device flow rate signal, and (c) a device conductance. The method may include computing an estimate of a flushing flow rate from the estimated exit pressure with a second function of (a) a patient conductance, and (b) a coupling parameter that characterizes a degree of coupling between the patient interface and the patient's nares. The method may include computing the estimate of the breathing pattern of the patient with a third function of (a) the flushing flow rate, and (b) the device flow rate signal.

In some implementations, the patient conductance may be an ideal patient conductance. The second function for estimating the flushing flow rate may include a ratio of the ideal patient conductance and the coupling parameter. The method may further include determining the ideal patient conductance in a calibration process. The first function for estimating the exit pressure may include a value of a density of the flow of air being generated by the respiratory therapy device. The second function for estimating the flushing flow rate may include a value of a density of the flow of air being generated by the respiratory therapy device. The second function for estimating the flushing flow rate may include scaling the patient conductance by a fluid dynamics asymmetry coefficient if the estimate of the exit pressure may be positive. The second function for estimating the flushing flow rate may include scaling, with a scaling factor, the flushing flow rate if the exit pressure may be positive. The scaling factor may be dependent on the device flow rate signal. The scaling factor may further depend on a fluid dynamics uncoupling coefficient that scales the device flow rate. The fluid dynamics uncoupling coefficient may be proportional to the coupling parameter.

In some implementations, the method may further include computing an estimate of the coupling parameter based on the estimated breathing pattern of the patient. Computing the estimate of the coupling parameter may include applying a proportional-integral controller. The proportional-integral controller may apply a correction to the coupling parameter that may be computed from a lowpass filtered version of a signal representing the estimated breathing pattern.

In some implementations, the method may further include generating an output that may include the estimated coupling parameter as a continuously-valued indicator of the usage of the flow therapy by the patient. The method may further include generating, with a flow rate sensor coupled to the controller, the device flow rate signal. The method may further include generating, with a pressure sensor coupled to the controller, the device pressure signal. In some implementations, the method may further include controlling, by the controller, an operation of the respiratory therapy device based on the computed estimate of a flushing flow rate. The operation may include an adjustment to a treatment flow rate for controlling generation of the flow of air. In some implementations, the method may include controlling, by the controller, an operation of the respiratory therapy device based on the computed estimate of the breathing pattern of the patient. The operation may include an adjustment to a treatment flow rate for controlling generation of the flow of air. The method may further include detecting, by the controller, a respiratory event based on an assessment of the computed estimate of the breathing pattern.

Some implementations of the present technology may include a processor-readable medium, having stored thereon processor-executable instructions which, when executed by one or more processors, cause the one or more processors to compute an estimate of a breathing pattern of a patient. The processor-executable instructions may be configured to execute any one, more or all of the aspects of the methods described herein.

Some implementations of the present technology may include respiratory therapy system. The respiratory system may include a respiratory therapy device that may include a blower configured to generate a flow of air at a controlled flow rate via an unsealed patient interface. The respiratory system may include a sensor configured to generate a device flow rate signal representative of a flow rate of the flow of air generated by the respiratory therapy device. The respiratory system may include a sensor configured to generate a device pressure signal representative of a pressure of the flow of air generated by the respiratory therapy device. The respiratory system may include a memory. The respiratory system may include one or more processors. The one or more processors may be configured to compute an estimate of an exit pressure representative of a pressure of the flow of air just outside an orifice of the unsealed patient interface as a function of (a) the device pressure signal, (b) the device flow rate signal, and (c) a device conductance. The one or more processors may be configured to compute an estimate of a flushing flow rate as a function of (a) the estimated exit pressure, (b) a patient conductance, and (c) a coupling parameter that characterizes a degree of coupling between the patient interface and the patient's nares. The one or more processors may be configured to compute an estimate of a breathing pattern of the patient as a function of (a) the flushing flow rate, and (b) the device flow rate signal.

In some implementations, the one or more processors may include or be a processor of a controller of the respiratory therapy device. The one or more processors may include or be a processor of an external computing device with which the respiratory therapy device may be in communication.

Some implementations of the present technology may include a method for generating a signal representing an estimate of a breathing pattern of a patient using a flow therapy device with an unsealed patient interface. The method may include computing an estimate of the breathing pattern of the patient as a function of (a) a device flow rate signal; (b) a device pressure signal; (c) a device conductance; (d) a patient conductance; and (e) a coupling parameter that characterizes a degree of coupling between the patient interface and the patient's nares. Optionally, the computing may include computing an estimate of an exit pressure representative of a pressure of a flow of air generated by the flow therapy device just outside an orifice of the unsealed patient interface. Optionally, the computing may include computing an estimate of a flushing flow rate from the estimated exit pressure.

Some implementations of the present technology may include a processor-readable medium, having stored thereon processor-executable instructions which, when executed by one or more processors, cause the one or more processors to compute an estimate of a breathing pattern of a patient. The processor-executable instructions configured to execute any of the methods described herein.

Some implementations of the present technology may include a respiratory therapy system. The respiratory therapy system may include a respiratory therapy device that may include a blower configured to generate a flow of air at a controlled flow rate via an unsealed patient interface. The respiratory therapy system may include a sensor configured to generate a device flow rate signal representative of a flow rate of the flow of air generated by the respiratory therapy device. The respiratory therapy system may include a sensor configured to generate a device pressure signal representative of a pressure of the flow of air generated by the respiratory therapy device. The respiratory therapy system may include a controller configured to generate a breathing pattern signal representing an estimate of a breathing pattern of a patient receiving a flow therapy from the respiratory therapy device. The controller may be configured to generate the breathing pattern signal as a function of (a) the device flow rate signal; (b) the device pressure signal; (c) a device conductance; (d) a patient conductance; and (e) a coupling parameter that characterizes a degree of coupling between the unsealed patient interface and the patient's nares. Optionally, to generate the breathing pattern signal, the controller may be configured to compute an estimate of an exit pressure representative of a pressure of the flow of air just outside an orifice of the unsealed patient interface. Optionally, to generate the breathing pattern signal, the controller may be configured to compute an estimate of a flushing flow rate from the estimated exit pressure.

The methods, systems, devices and apparatus described may be implemented so as to improve the functionality of a processor, such as a processor of a specific purpose computer, respiratory monitor and/or a respiratory therapy apparatus. Moreover, the described methods, systems, devices and apparatus can provide improvements in the technological field of automated management, monitoring and/or treatment of respiratory conditions, including, for example, sleep disordered breathing.

Of course, portions of the aspects may form sub-aspects of the present technology. Also, various ones of the sub-aspects and/or aspects may be combined in various manners and also constitute additional aspects or sub-aspects of the present technology.

Other features of the technology will be apparent from consideration of the information contained in the following detailed description, abstract, drawings and claims.

4 BRIEF DESCRIPTION OF THE DRAWINGS

The present technology is illustrated by way of example, and not by way of limitation, in the figures of the accompanying drawings, in which like reference numerals refer to similar elements including:

4.1 Respiratory Therapy Systems

FIG. 1 shows a system including a patient 1000 wearing a patient interface 3000, in the form of a full-face mask, receiving a supply of air at positive pressure from an RT device 4000. Air from the RT device is conditioned in a humidifier 5000, and passes along an air circuit 4170 to the patient 1000. The patient is sleeping in a side sleeping position.

4.2 Human Respiratory System

FIG. 2 shows an overview of a human respiratory system including the nasal and oral cavities, the larynx, vocal folds, oesophagus, trachea, bronchus, lung, alveolar sacs, heart and diaphragm.

4.3 Patient Interface

4.4 RT Device

Figure 4A:
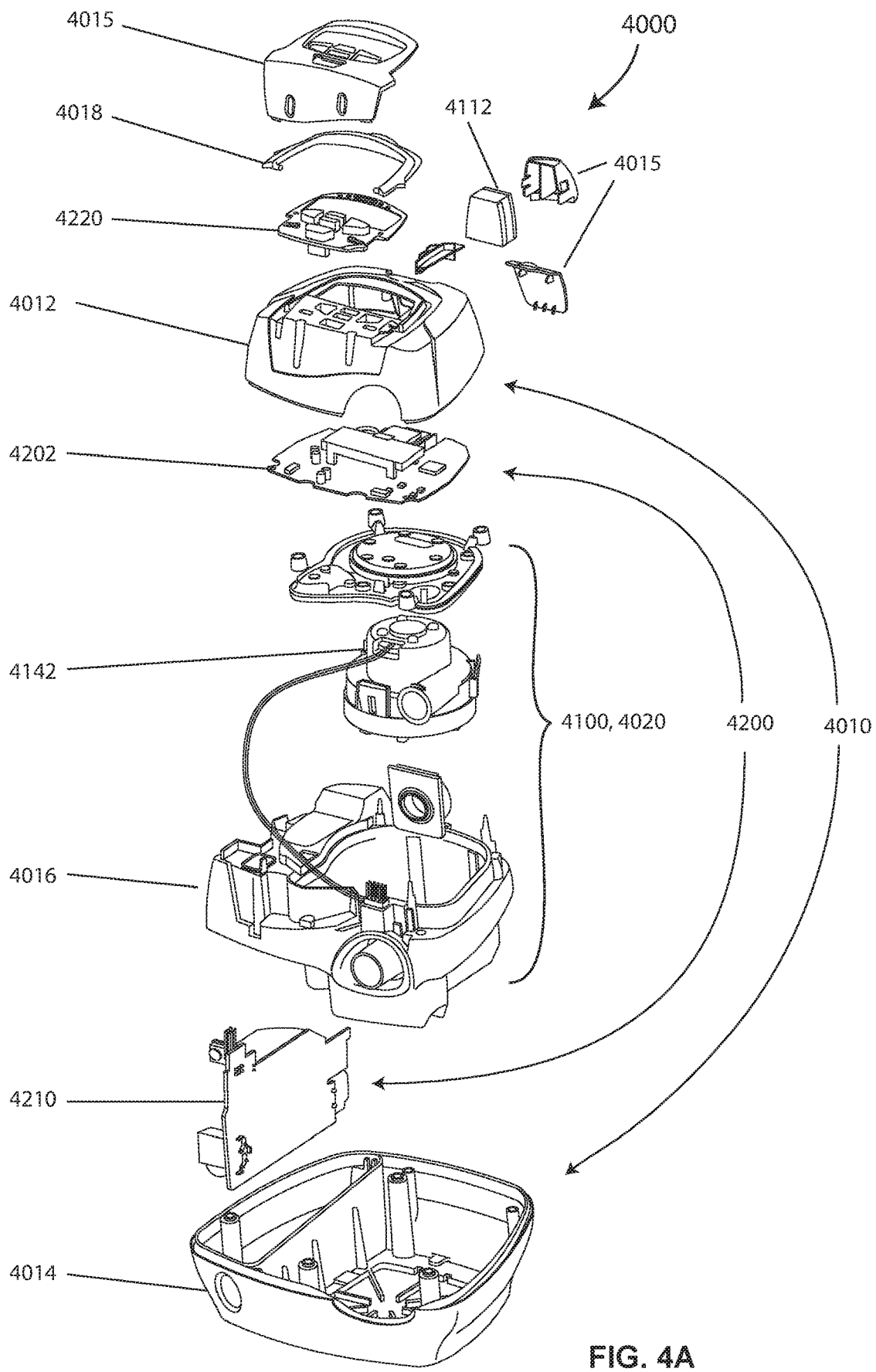

FIG. 4A shows an RT device in accordance with one form of the present technology.

Figure 4B:
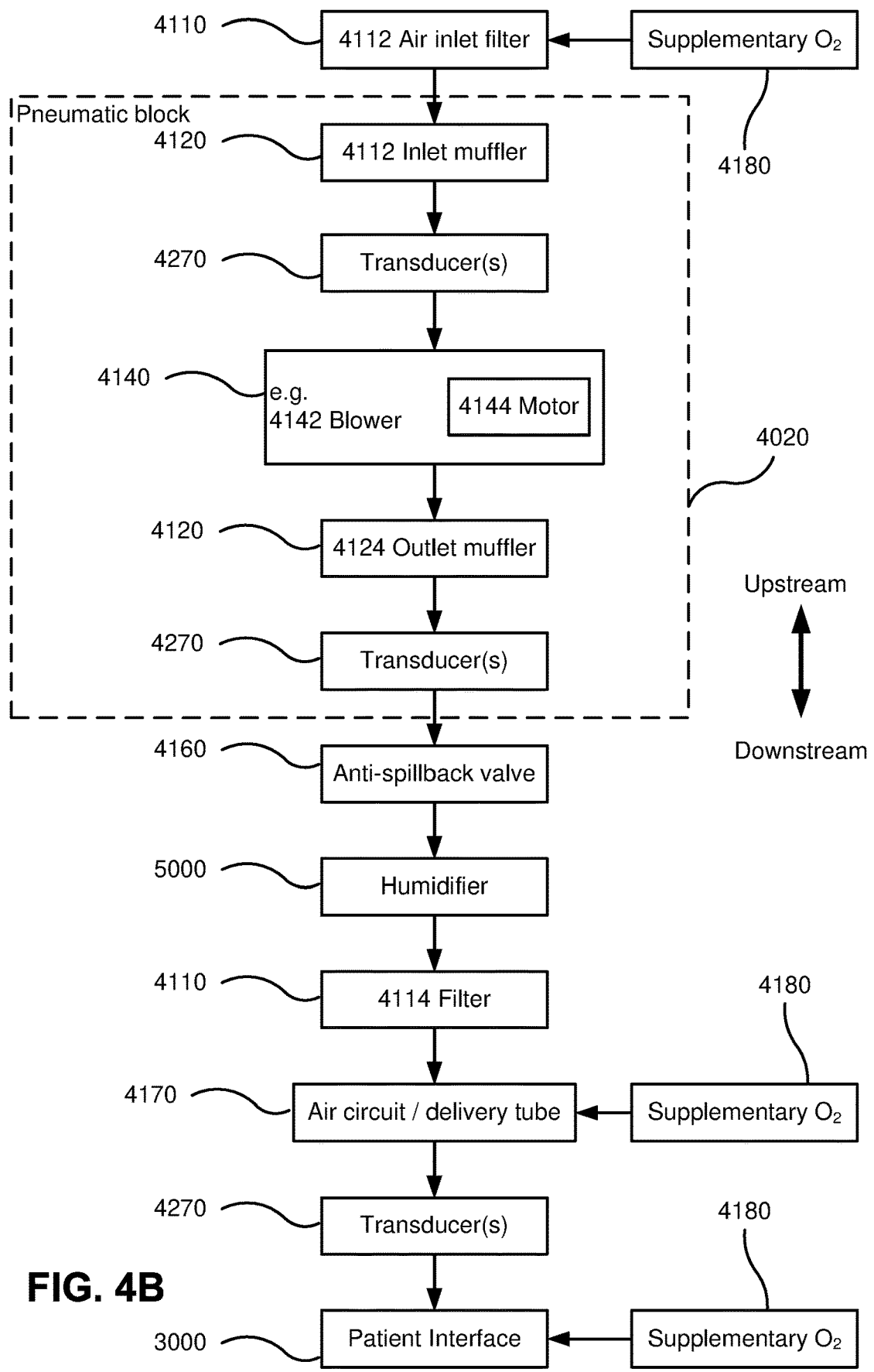

FIG. 4B is a schematic diagram of the pneumatic path of an RT device in accordance with one form of the present technology. The directions of upstream and downstream are indicated with reference to the blower and the patient interface. The blower is defined to be upstream of the patient interface and the patient interface is defined to be downstream of the blower, regardless of the actual flow direction at any particular moment. Items which are located within the pneumatic path between the blower and the patient interface are downstream of the blower and upstream of the patient interface.

Figure 4C:
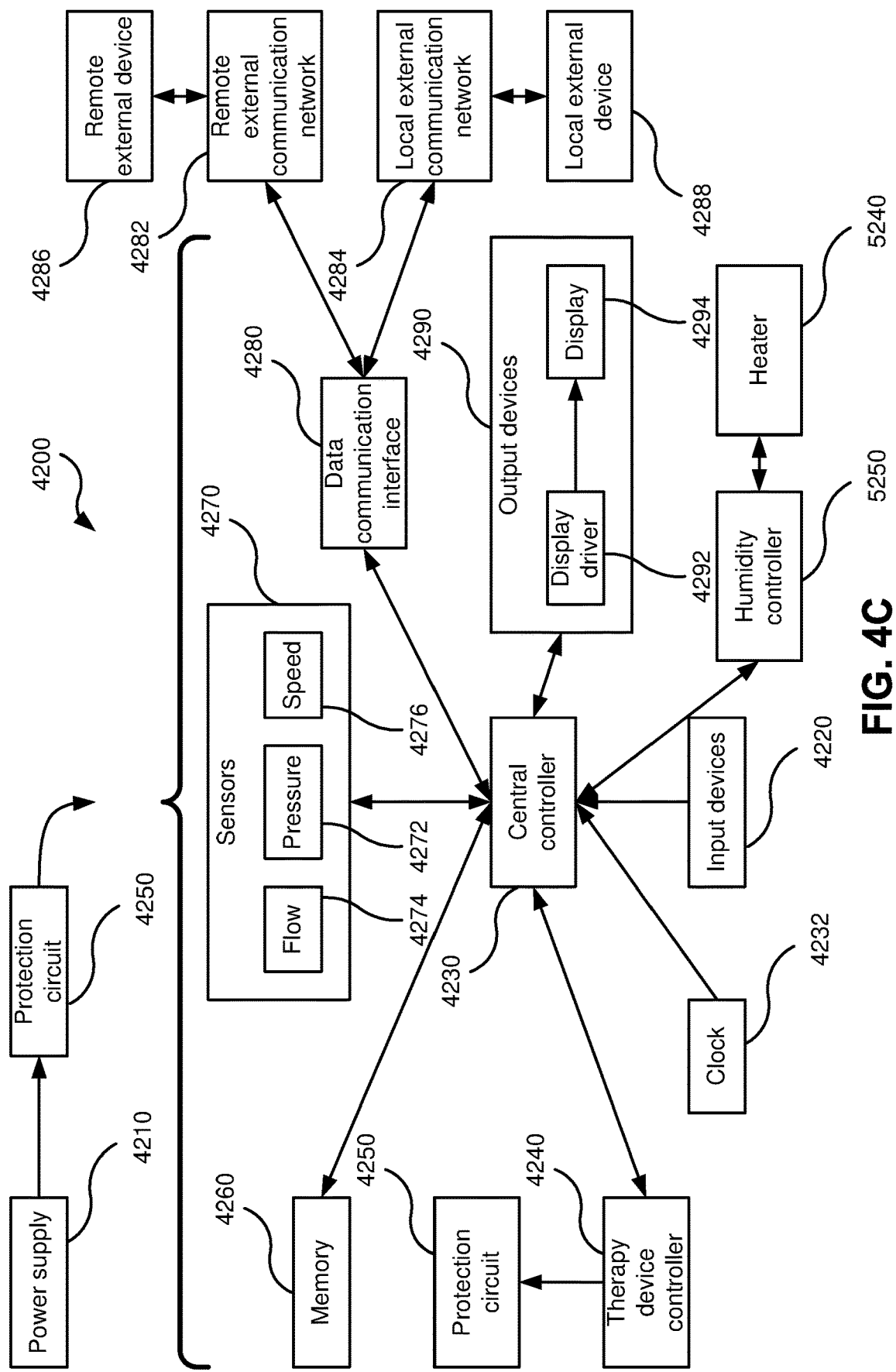

FIG. 4C is a schematic diagram of the electrical components of an RT device in accordance with one form of the present technology.

Figure 4D:
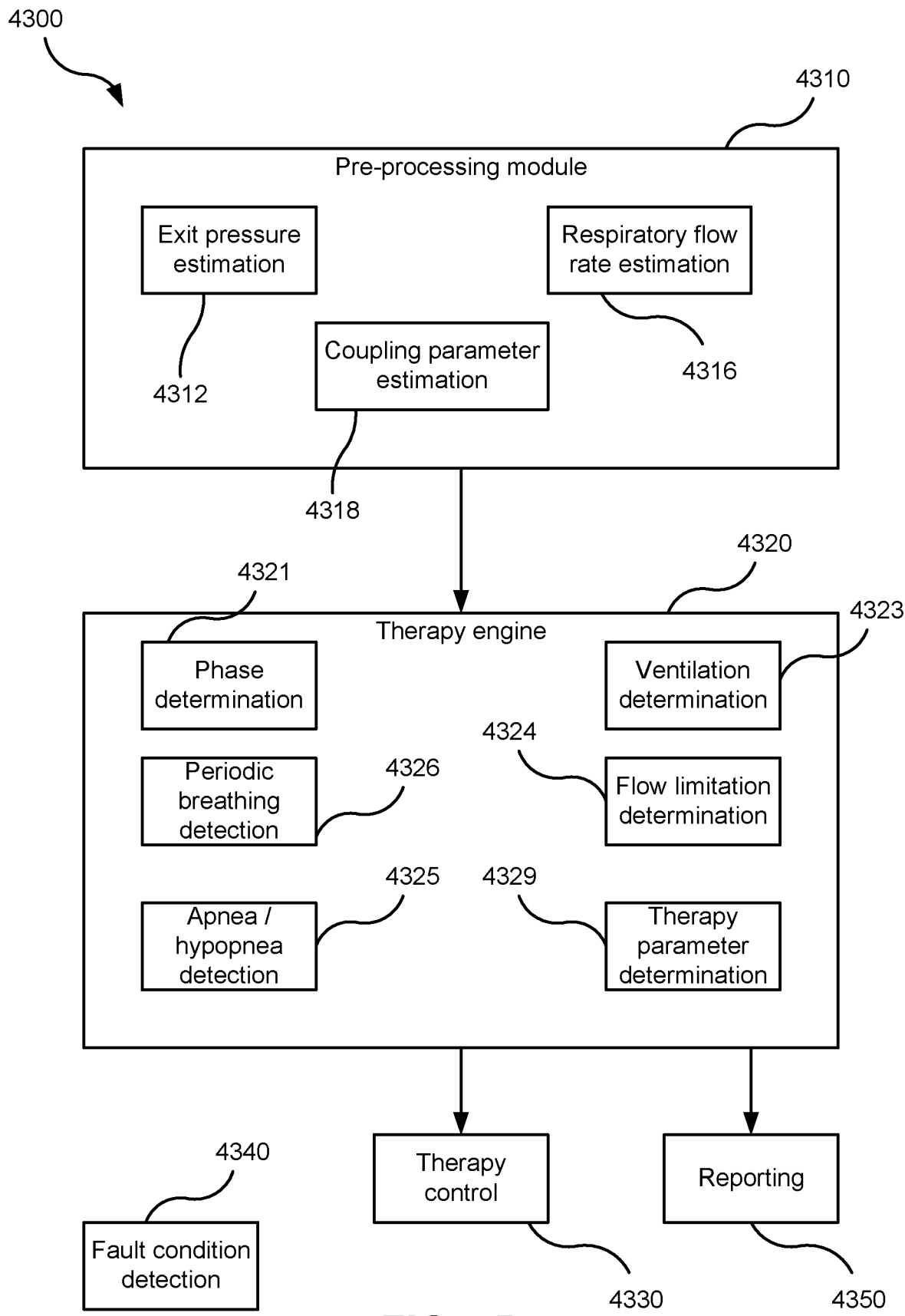

FIG. 4D is a schematic diagram of the algorithms implemented in an RT device in accordance with one form of the present technology.

4.5 Humidifier

Figure 5A:
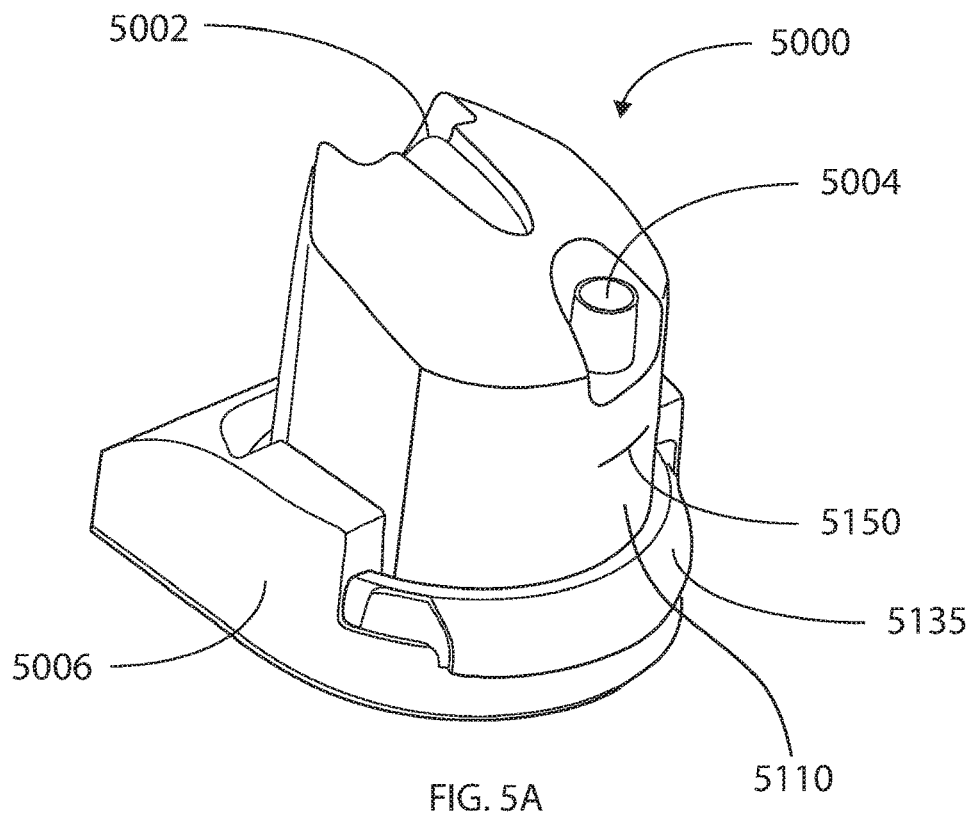

FIG. 5A shows an isometric view of a humidifier in accordance with one form of the present technology.

Figure 5B:
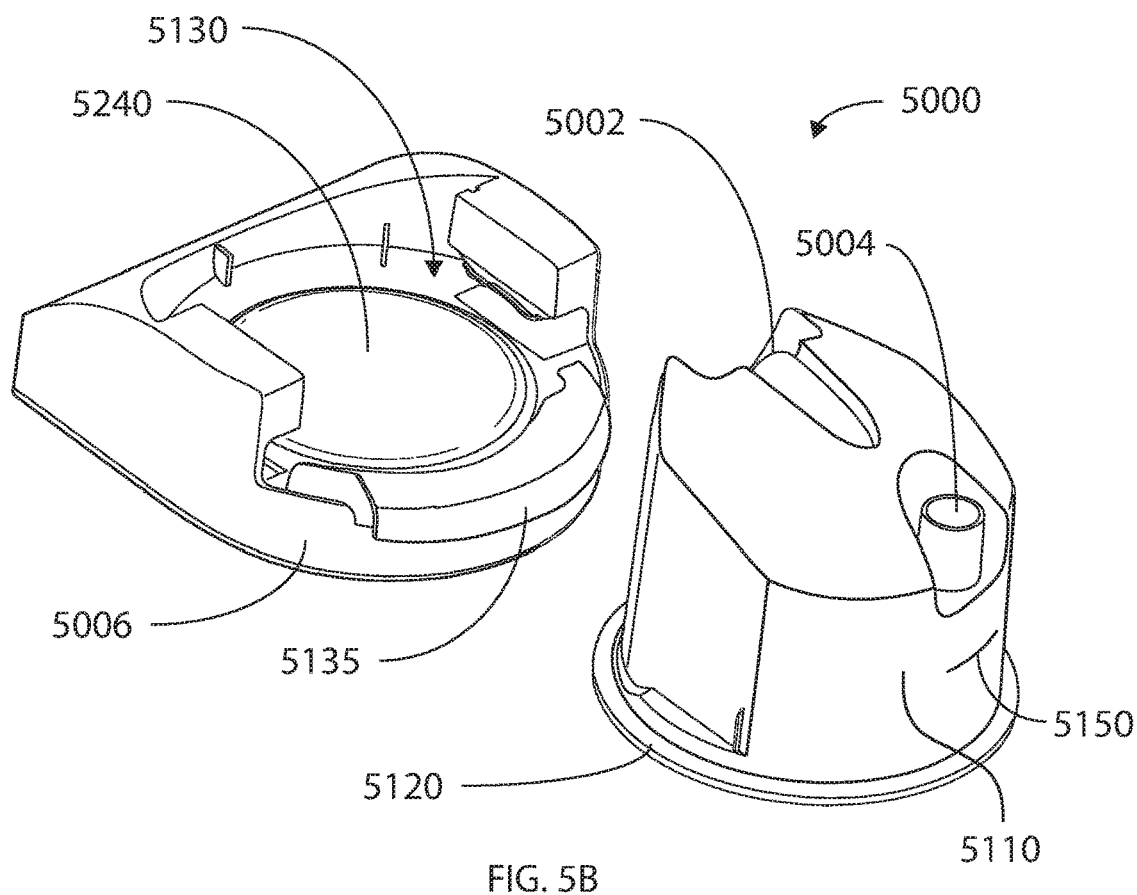

FIG. 5B shows an isometric view of a humidifier in accordance with one form of the present technology, showing a humidifier reservoir 5110 removed from the humidifier reservoir dock 5130.

4.6 Breathing Waveforms

Figure 6:
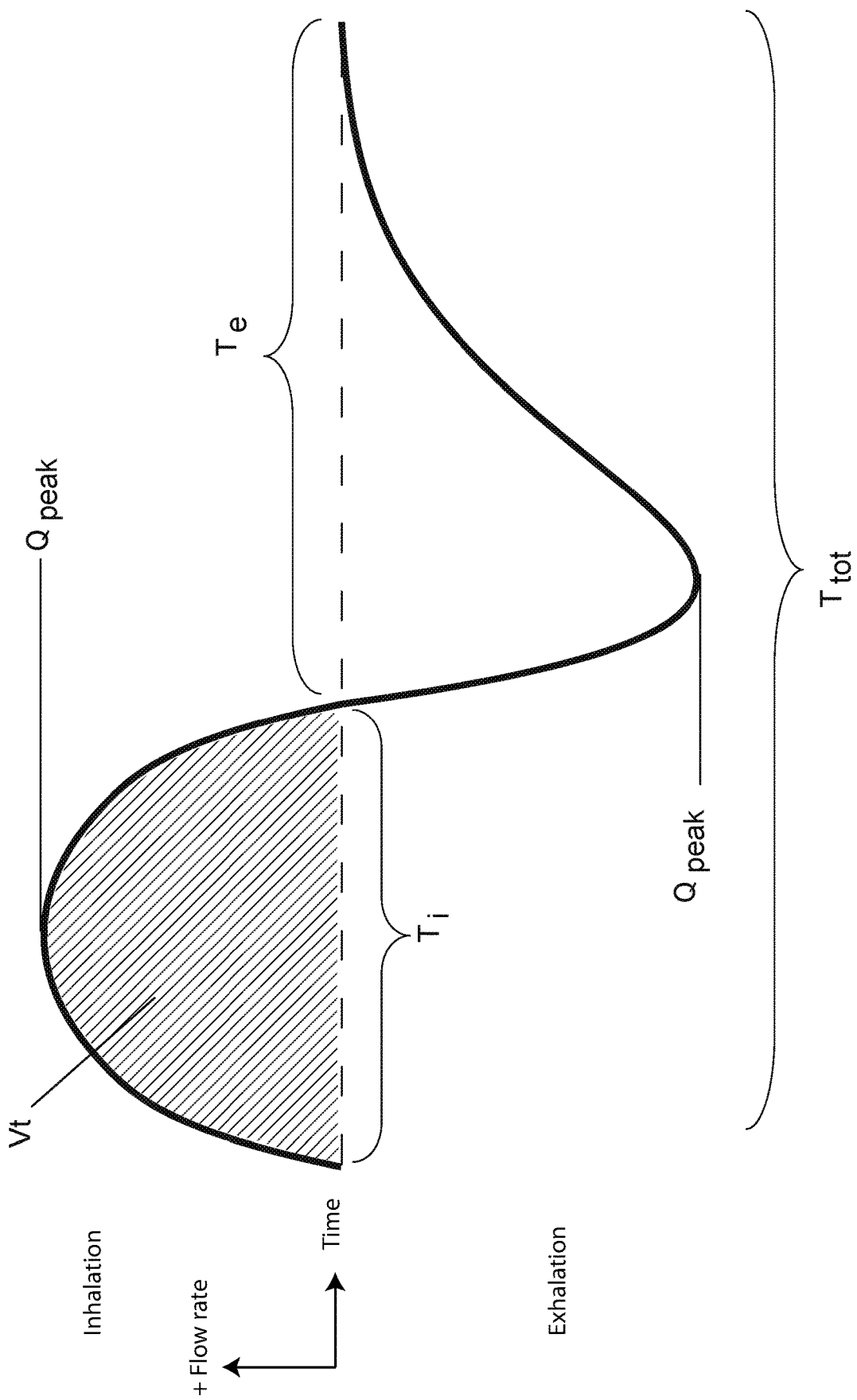

FIG. 6 shows a model typical breath waveform of a person while sleeping. The horizontal axis is time, and the vertical axis is respiratory flow rate. While the parameter values may vary, a typical breath may have the following approximate values: tidal volume Vt 0.5 L, inhalation time Ti 1.6 s, peak inspiratory flow rate Qpeak 0.4 L/s, exhalation time Te 2.4 s, peak expiratory flow rate Qpeak −0.5 L/s. The total duration of the breath, Ttot, is about 4 s. The person typically breathes at a rate of about 15 breaths per minute (BPM), with Ventilation Vent about 7.5 L/min. A typical duty cycle, the ratio of Ti to Ttot, is about 40%.

Figure 7:
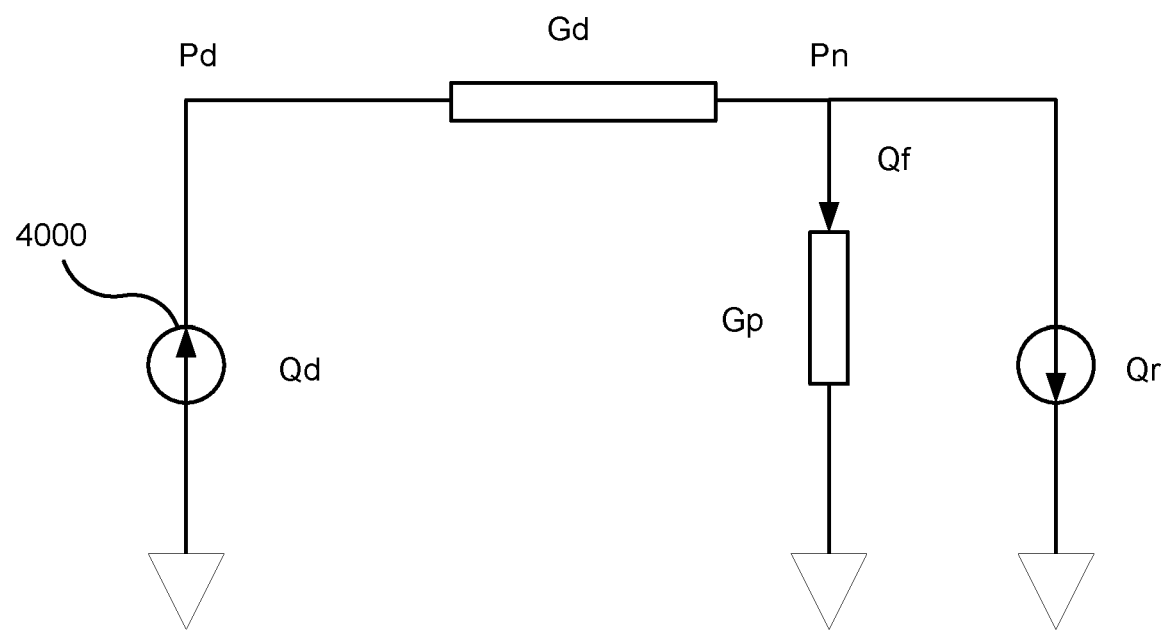

FIG. 7 is an illustration of a simple circuit model of a flow therapy system of which the respiratory therapy (RT) device, such as when configured as an RFT device, of FIG. 4A forms a part in some forms of the present technology.

Figure 1:
Figure 2:
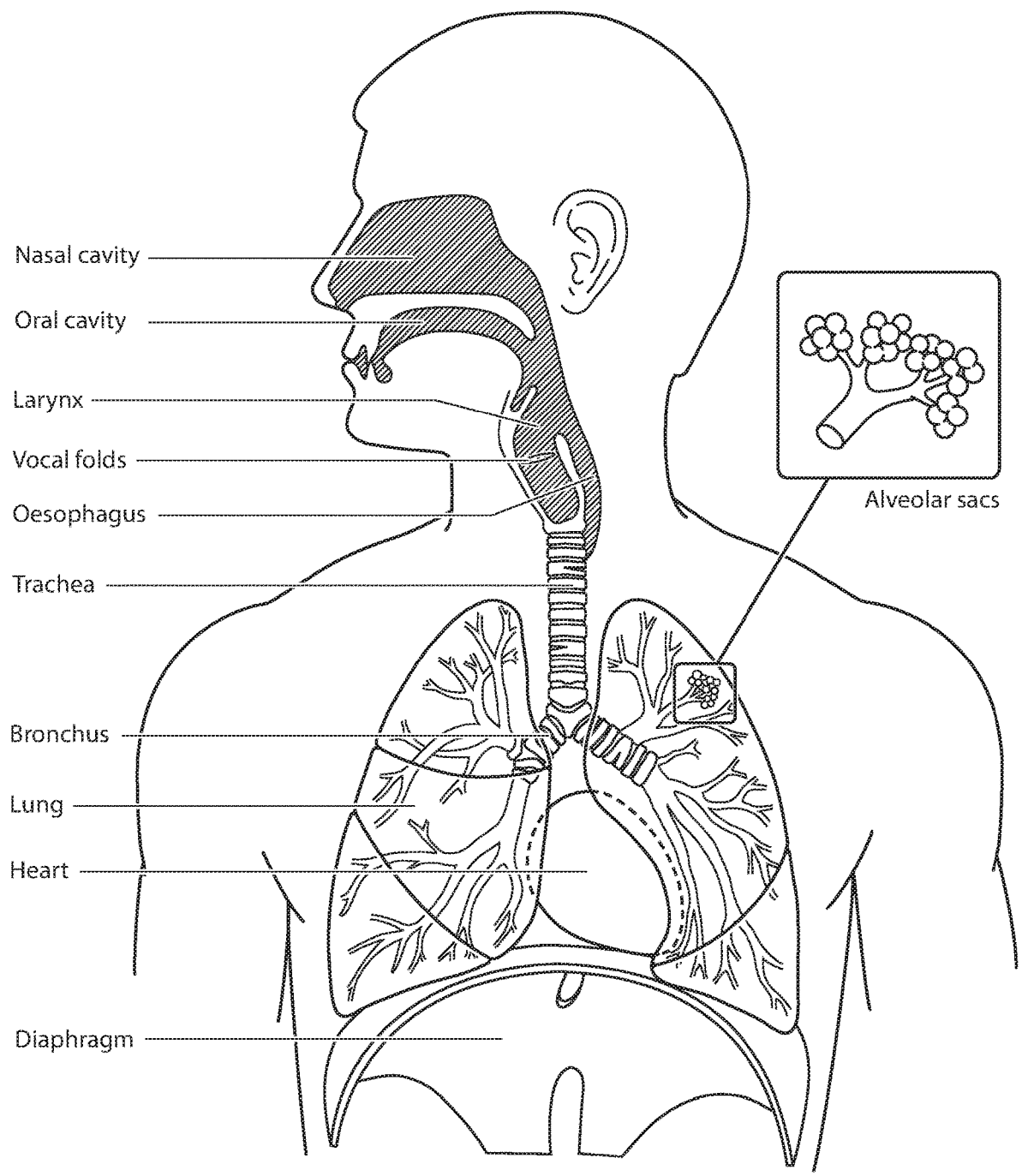
Figure 3A:
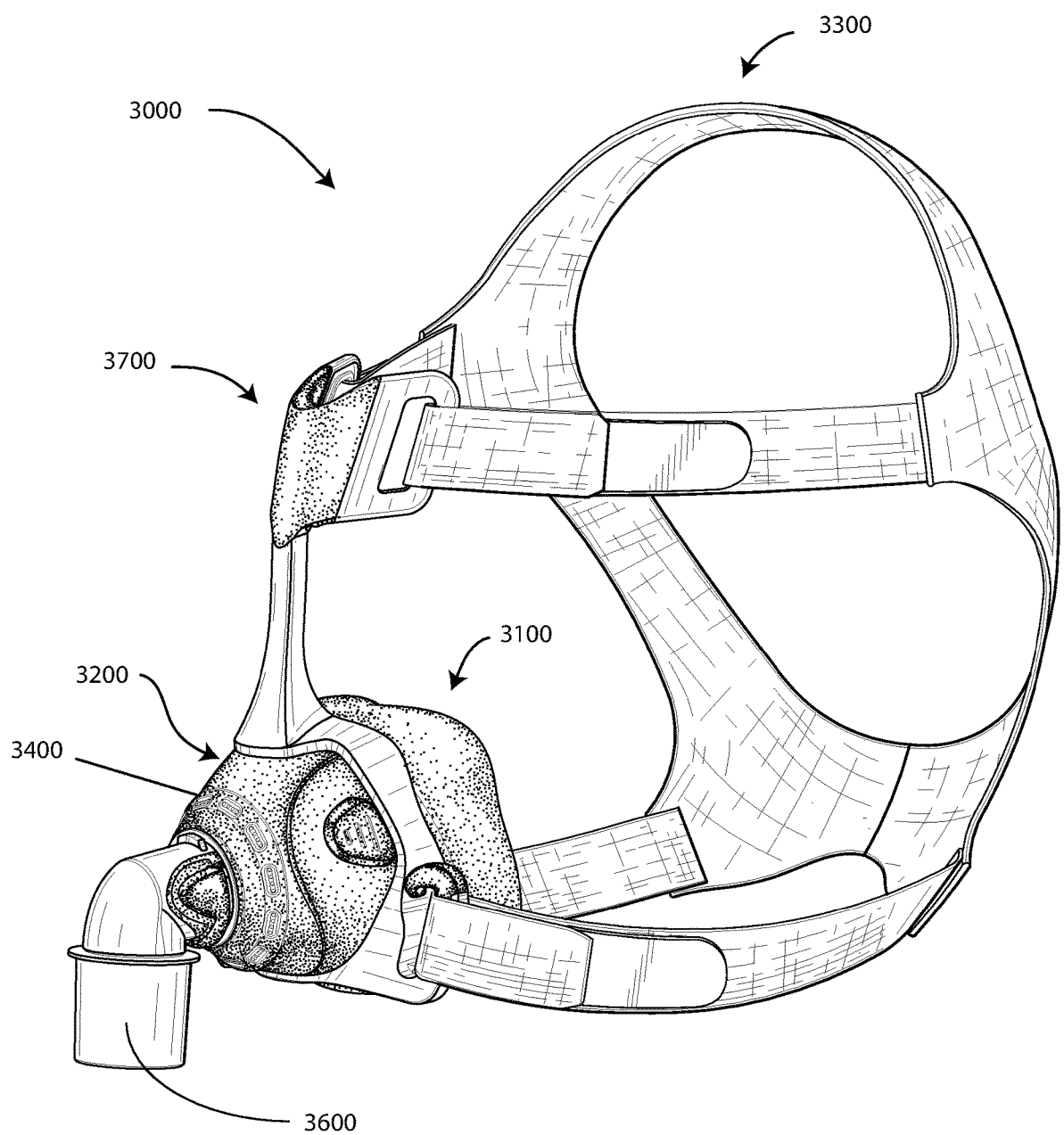
FIG. 3A shows a patient interface in the form of a nasal mask in accordance with one form of the present technology, that may be used with, for example, an RPT device.
Figure 3B:
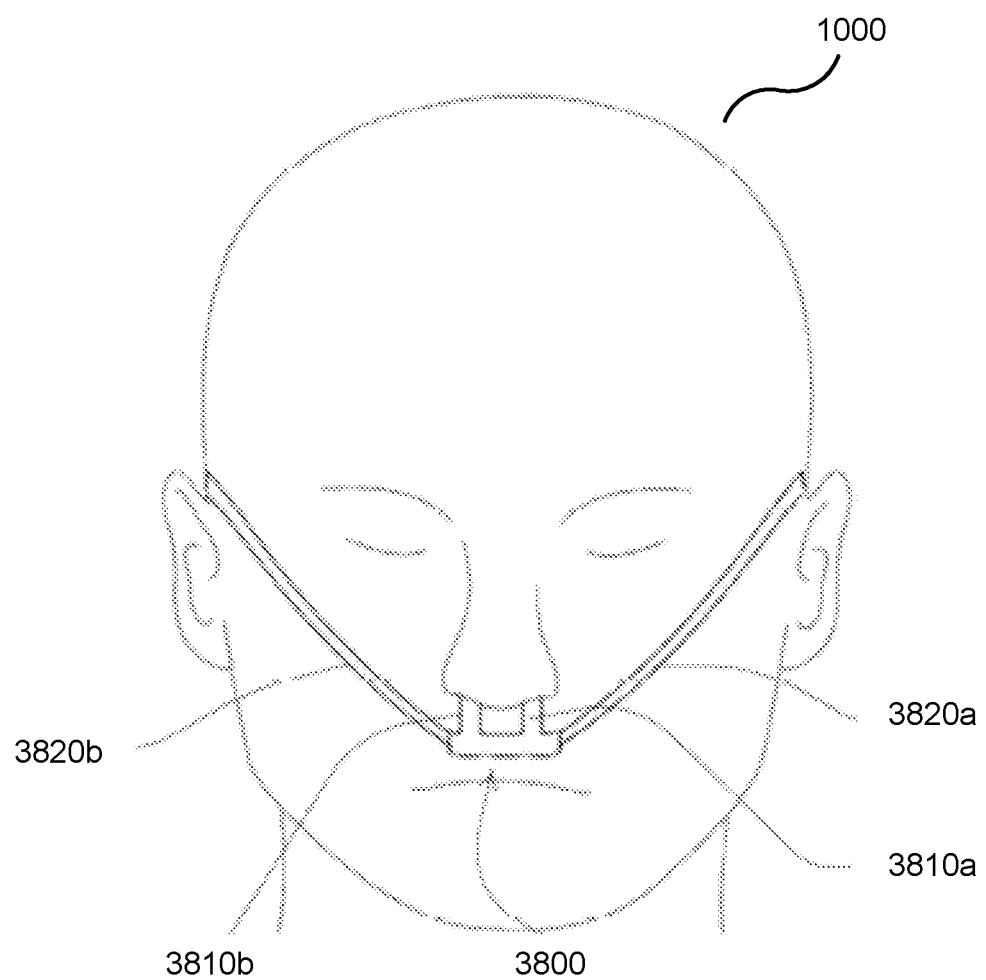
FIG. 3B shows a patient interface in the form of a nasal cannula in accordance with one form of the present technology, may be used with, for example, an RFT device.
Figure 8:
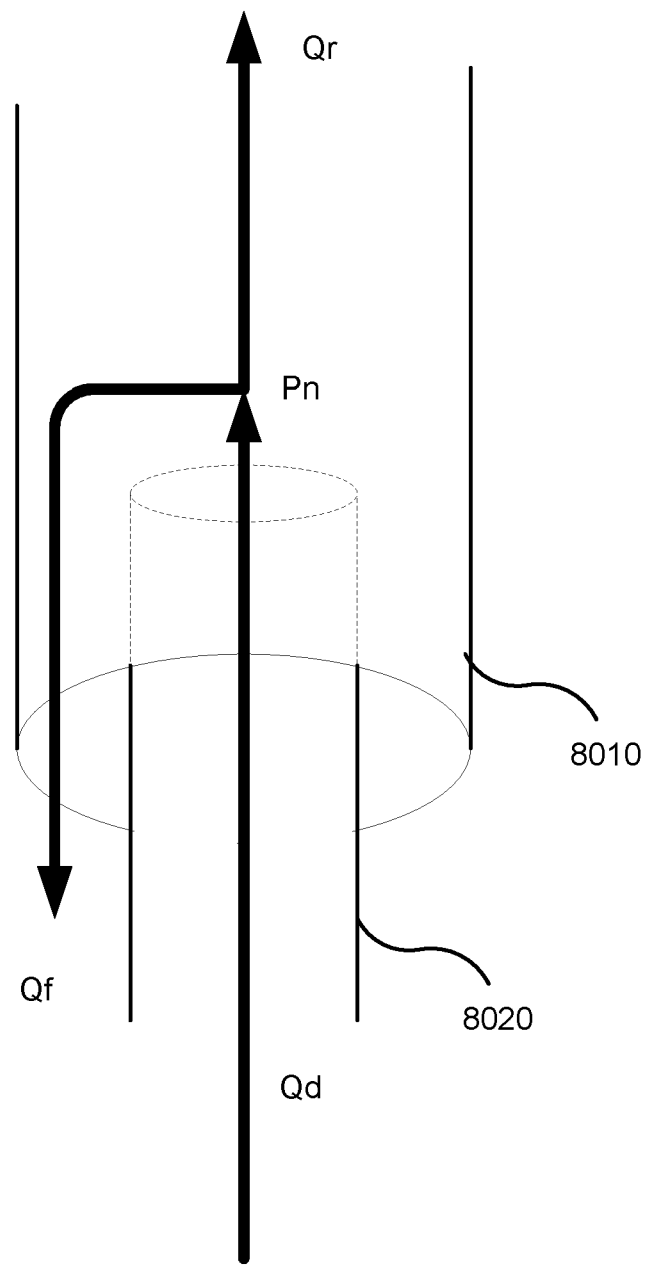

FIG. 8 is a simplified illustration of one cannula prong seated within a naris of a patient when the nasal cannula of FIG. 3B is in use in a flow therapy system such as that illustrated in FIG. 7.

Figure 9:
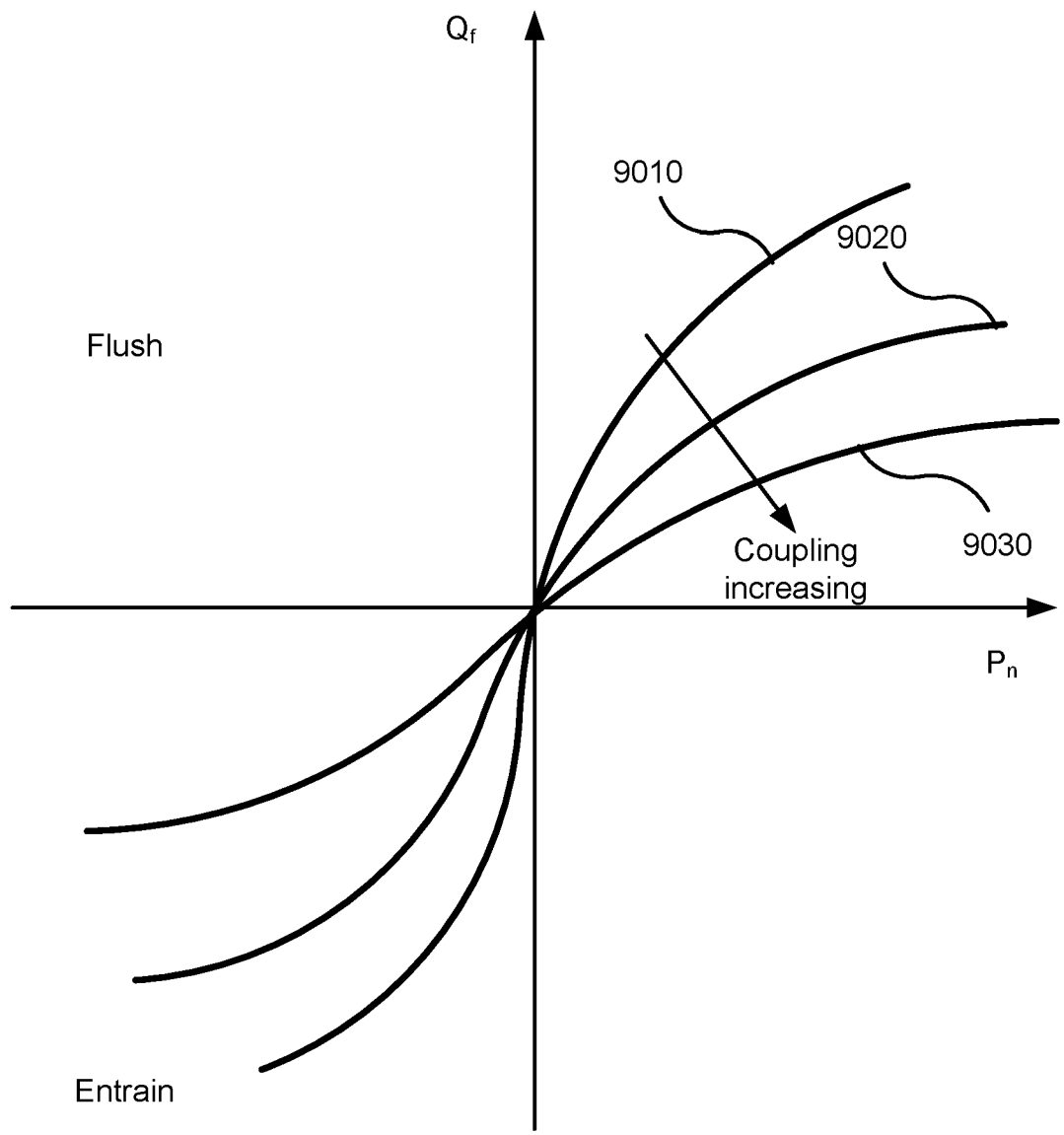

FIG. 9 is a graph illustrating relationships between flushing flow rate (entraining or flushing with respect to ambient at a gap(s) between the naris and cannula) and exit pressure in a flow therapy system such as that illustrated in FIG. 7 with different degrees of coupling.

Figure 10:
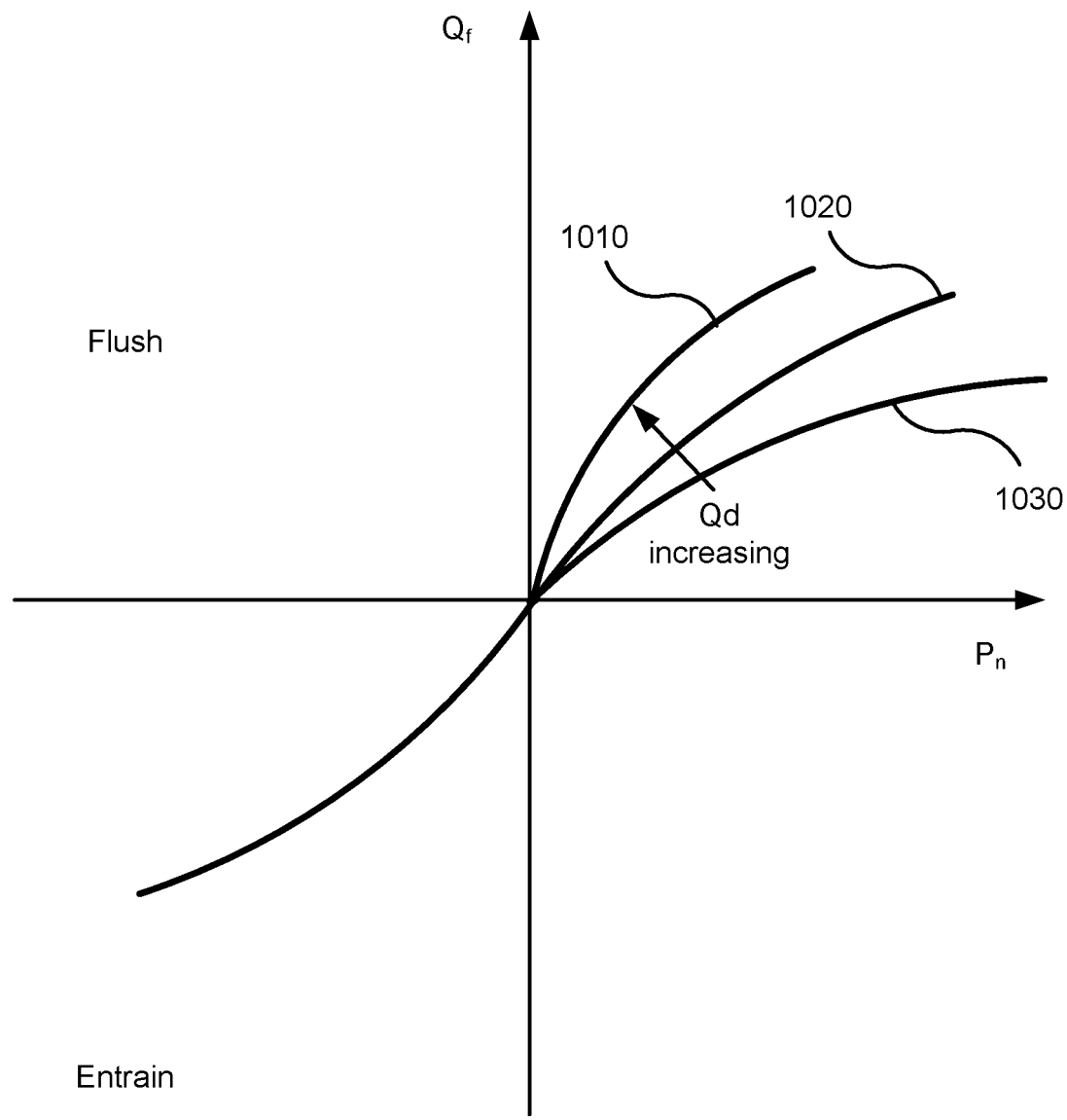

FIG. 10 is a graph illustrating relationships between flushing flow rate and exit pressure in a flow therapy system such as that illustrated in FIG. 7 with different device flow rates.

Figure 11:
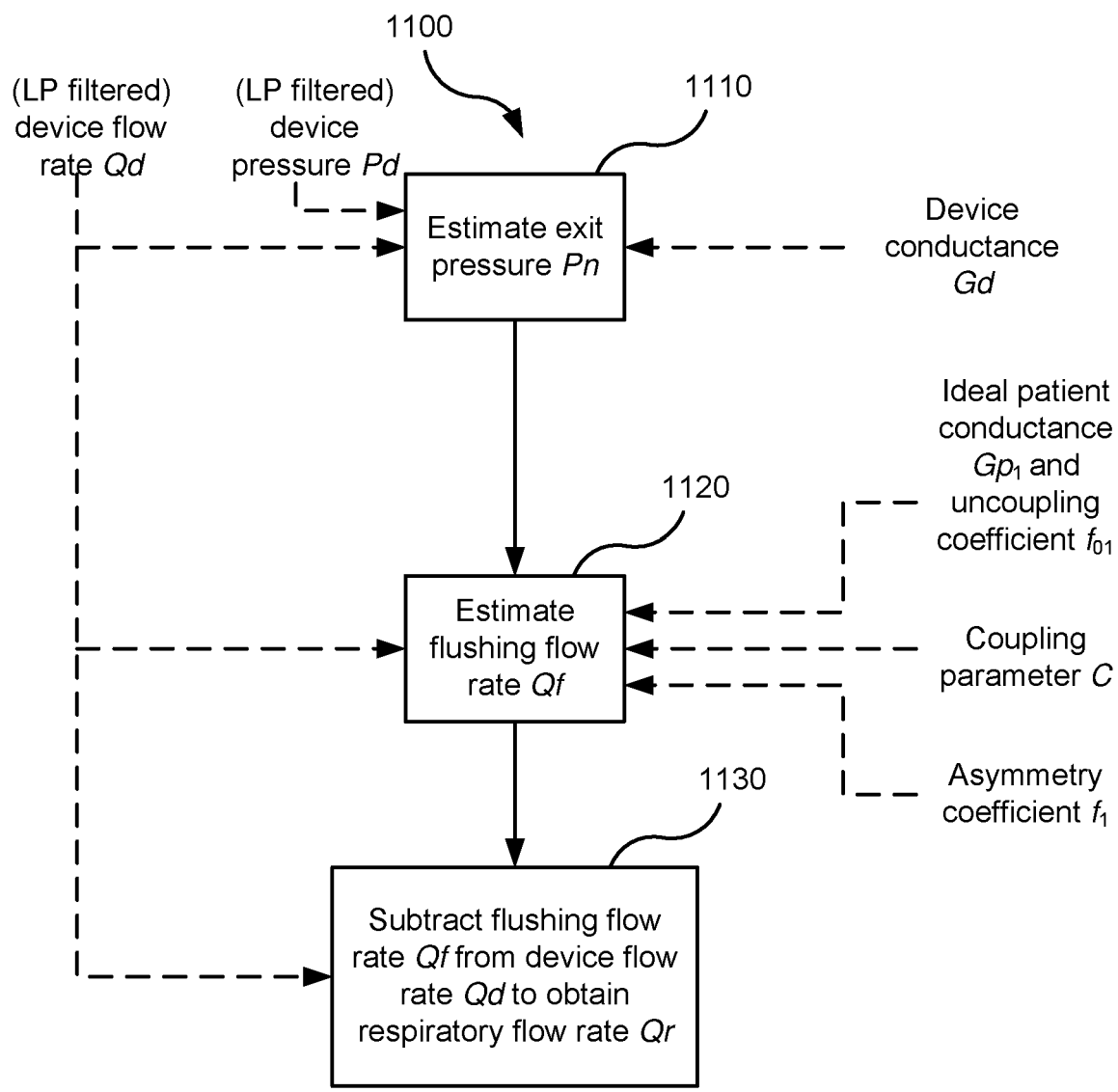

FIG. 11 is a flow chart illustrating an example method of estimating the respiratory flow rate of the patient from the device flow rate and the device pressure in accordance with one form of the present technology.

Figure 12:
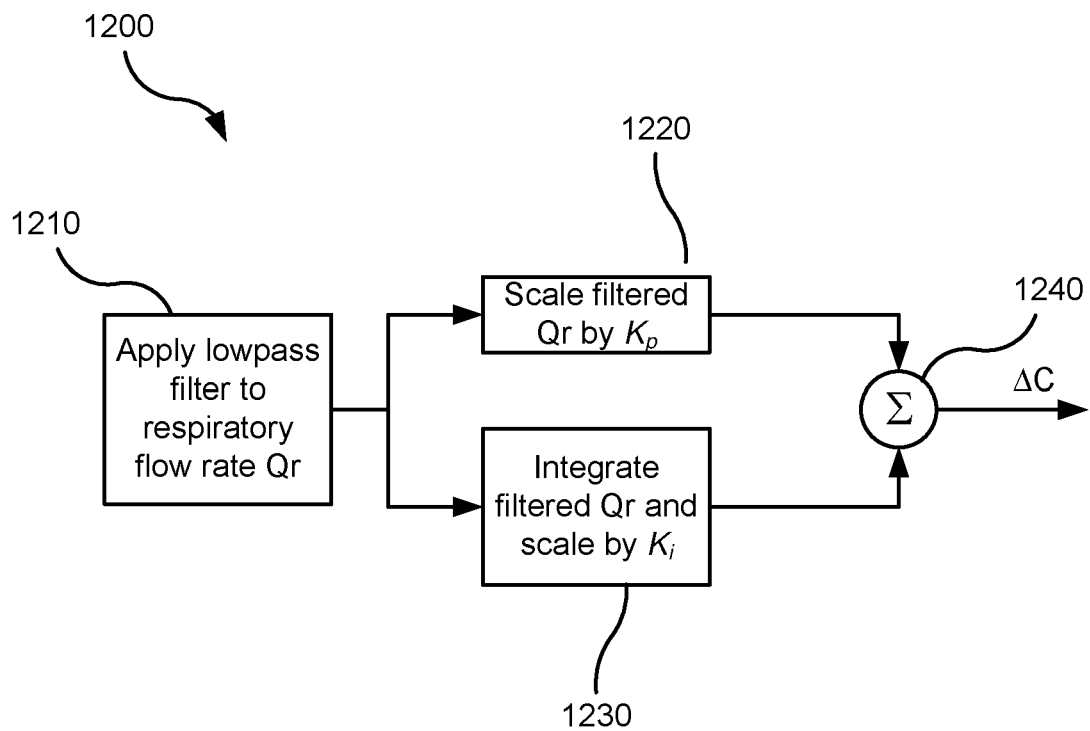

FIG. 12 is a flow chart illustrating an example method of estimating the coupling parameter from the respiratory flow rate of the patient in accordance with one form of the present technology.

Figure 13:
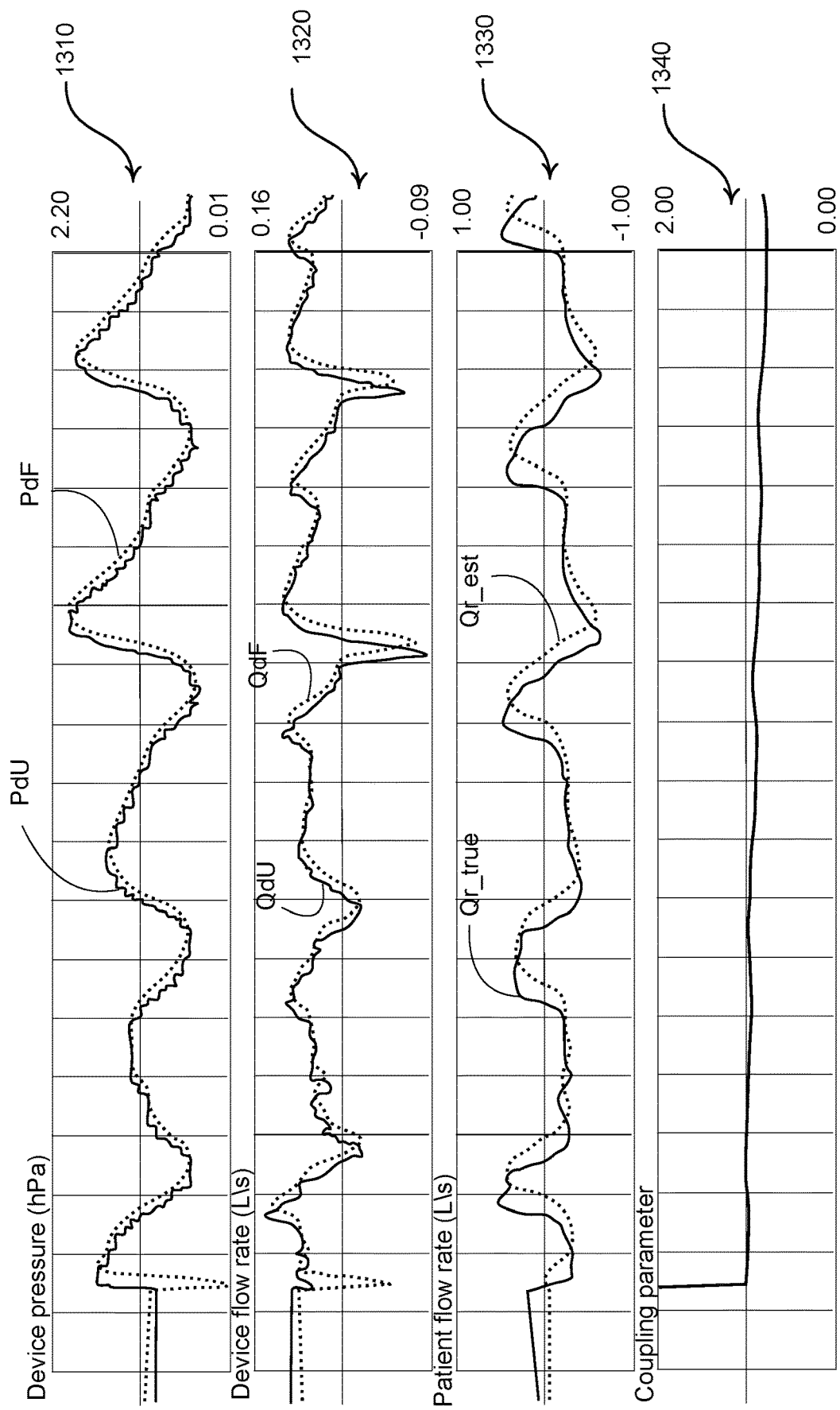

FIG. 13 contains a set of graphs illustrating the outputs of the example respiratory flow rate estimation algorithm of FIG. 11 and a coupling parameter estimating algorithm in accordance with one form of the present technology.

Figure 14:
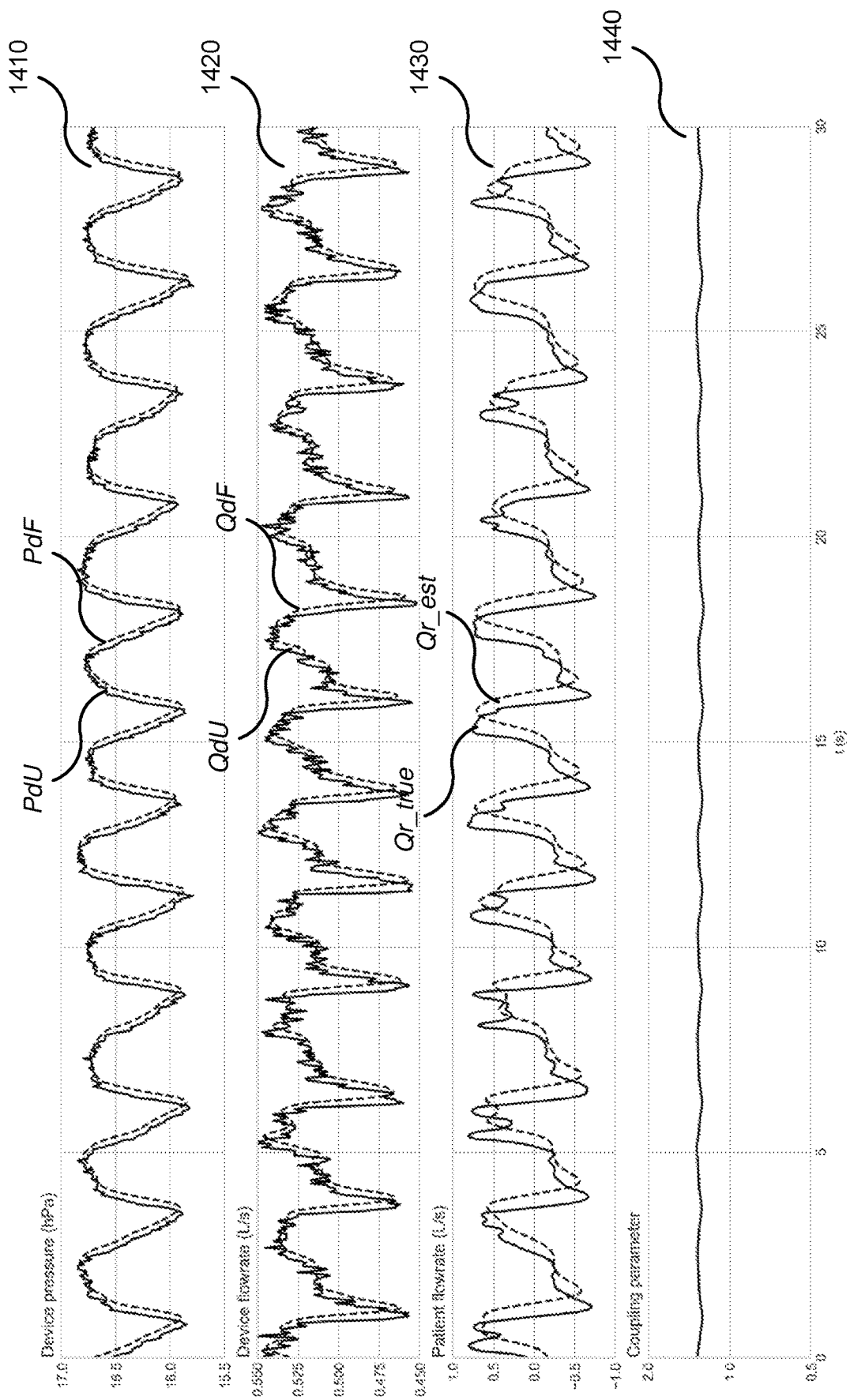

FIG. 14 contains a further set of graphs illustrating the outputs of the example respiratory flow rate estimation algorithm of FIG. 11 and a coupling parameter estimating algorithm in accordance with one form of the present technology.

5 DETAILED DESCRIPTION OF EXAMPLES OF THE TECHNOLOGY

Before the present technology is described in further detail, it is to be understood that the technology is not limited to the particular examples described herein, which may vary. It is also to be understood that the terminology used in this disclosure is for the purpose of describing only the particular examples discussed herein, and is not intended to be limiting.

The following description is provided in relation to various examples which may share one or more common characteristics and/or features. It is to be understood that one or more features of any one example may be combinable with one or more features of another example or other examples. In addition, any single feature or combination of features in any of the examples may constitute a further example.

5.1 Therapy

In one form, the present technology comprises a method for treating a respiratory disorder comprising providing a flow of air to the nasal cavity of the patient via one or both nares.

5.2 Respiratory Therapy Systems

In one form, the present technology comprises a respiratory flow therapy system for treating a respiratory disorder. The respiratory flow therapy system may comprise an RT device 4000 for supplying a flow of air to the patient 1000 via an air circuit 4170 and a patient interface 3000 or 3800.

5.3 Patient Interface

A sealed patient interface 3000 in accordance with one aspect of the present technology comprises the following functional aspects: a seal-forming structure 3100, a plenum chamber 3200, a positioning and stabilising structure 3300, a vent 3400, one form of connection port 3600 for connection to air circuit 4170, and a forehead support 3700. In some forms a functional aspect may be provided by one or more physical components. In some forms, one physical component may provide one or more functional aspects. In use the seal-forming structure 3100 is arranged to surround an entrance to the airways of the patient so as to maintain positive pressure at the entrance(s) to the airways of the patient 1000. The sealed patient interface 3000 is therefore suitable for delivery of positive pressure therapy.

An unsealed patient interface 3800, in the form of a nasal cannula, includes nasal prongs 3810a, 3810b which can deliver air to respective nares of the patient 1000 via respective orifices in their tips. Such nasal prongs do not generally form a seal with the inner or outer skin surface of the nares. This type of interface results in one or more gaps that are present in use by design (intentional) but are typically not fixed in size such that they may vary unpredictably by movement during use. This can present a complex pneumatic variable for a respiratory therapy system when pneumatic control and/or monitoring is implemented, unlike other types of mask-based respiratory therapy systems. The air to the nasal prongs may be delivered by one or more air supply lumens 3820a, 3820b that are coupled with the nasal cannula 3800. The lumens 3820a, 3820b lead from the nasal cannula 3800 to a respiratory therapy device via an air circuit. The unsealed patient interface 3800 is particularly suitable for delivery of flow therapies, in which the RT device generates the flow of air at controlled flow rates rather than controlled pressures. The "vent" or gap at the unsealed patient interface 3800, through which uninspired or exhaled airflow escapes to ambient, is the generally annular passage between the end of the prongs 3810a and 3810b of the cannula 3800 via the patient's nares to atmosphere.

5.4 RT Device

An RT device 4000 in accordance with one aspect of the present technology comprises mechanical, pneumatic, and/or electrical components and is configured to execute one or more algorithms 4300, such as any of the methods, in whole or in part, described herein. The RT device 4000 may be configured to generate a flow of air for delivery to a patient's airways, such as to treat one or more of the respiratory conditions described elsewhere in the present document.

In one form, the RT device 4000 is constructed and arranged to be capable of supplying a flow of air at a flow rate in a range of 0 L/min to +150 L/min.

The RT device may have an external housing 4010, formed in two parts, an upper portion 4012 and a lower portion 4014. Furthermore, the external housing 4010 may include one or more panel(s) 4015. The RT device 4000 comprises a chassis 4016 that supports one or more internal components of the RT device 4000. The RT device 4000 may include a handle 4018.

The pneumatic path of the RT device 4000 may comprise one or more air path items, e.g., an inlet air filter 4112, an inlet muffler 4122, a pressure generator 4140 capable of supplying air at positive pressure (e.g., a blower 4142), an outlet muffler 4124 and one or more transducers 4270, such as pressure sensors 4272 and flow rate sensors 4274.

One or more of the air path items may be located within a removable unitary structure which will be referred to as a pneumatic block 4020. The pneumatic block 4020 may be located within the external housing 4010. In one form a pneumatic block 4020 is supported by, or formed as part of the chassis 4016.

The RT device 4000 may have an electrical power supply 4210, one or more input devices 4220, a central controller 4230, a therapy device controller 4240, a pressure generator 4140, one or more protection circuits 4250, memory 4260, transducers 4270, data communication interface 4280 and one or more output devices 4290. Electrical components 4200 may be mounted on a single Printed Circuit Board Assembly (PCBA) 4202. In an alternative form, the RT device 4000 may include more than one PCBA 4202.

5.4.1 RT Device Mechanical & Pneumatic Components

An RT device may comprise one or more of the following components in an integral unit. In an alternative form, one or more of the following components may be located as respective separate units.

5.4.1.1 Air Filter(s)

An RT device in accordance with one form of the present technology may include an air filter 4110, or a plurality of air filters 4110.

In one form, an inlet air filter 4112 is located at the beginning of the pneumatic path upstream of a pressure generator 4140.

In one form, an outlet air filter 4114, for example an antibacterial filter, is located between an outlet of the pneumatic block 4020 and a patient interface 3000.

5.4.1.2 Muffler(s)

An RT device in accordance with one form of the present technology may include a muffler 4120, or a plurality of mufflers 4120.

In one form of the present technology, an inlet muffler 4122 is located in the pneumatic path upstream of a pressure generator 4140.

In one form of the present technology, an outlet muffler 4124 is located in the pneumatic path between the pressure generator 4140 and a patient interface 3000.

5.4.1.3 Pressure Generator

In one form of the present technology, a pressure generator 4140 for producing a flow, or a supply, of air at (or induced by) positive pressure is a controllable blower 4142. For example, the blower 4142 may include a brushless DC motor 4144 with one or more impellers housed in a blower housing, such as in a volute. The blower may be capable of delivering a supply of air, for example at a rate of up to about 120 litres/minute, at a positive pressure in a range from about 4 $cmH_2O$ to about 20 $cmH_2O$, or in other forms up to about 30 $cmH_2O$ when delivering positive pressure therapy. The blower may be as described in any one of the following patents or patent applications the contents of which are incorporated herein by reference in their entirety: U.S. Pat. Nos. 7,866,944; 8,638,014; 8,636,479; and PCT Patent Application Publication No. WO 2013/020167.

The pressure generator 4140 may be under the control of the therapy device controller 4240.

In other forms, a pressure generator 4140 may be a piston-driven pump, a pressure regulator connected to a high pressure source (e.g. compressed air reservoir), or a bellows.

5.4.1.4 Transducer(s)

Transducers may be internal of the RT device, or external of the RT device. External transducers may be located for example on or form part of the air circuit, e.g., the patient interface. External transducers may be in the form of non-contact sensors such as a Doppler radar movement sensor that transmit or transfer data to the RT device.

In one form of the present technology, one or more transducers 4270 are located upstream and/or downstream of the pressure generator 4140. The one or more transducers 4270 may be constructed and arranged to generate signals representing properties of the flow of air such as a flow rate, a pressure or a temperature at that point in the pneumatic path.

In one form of the present technology, one or more transducers 4270 may be located proximate to the patient interface 3000 or 3800.

In one form, a signal from a transducer 4270 may be filtered, such as by low-pass, high-pass or band-pass filtering.

5.4.1.4.1 Flow Rate Sensor

A flow rate sensor 4274 in accordance with the present technology may be based on a differential pressure transducer, for example, an SDP600 Series differential pressure transducer from SENSIRION.

In one form, a signal generated by the flow rate sensor 4274 and representing the device flow rate Qd is received by the central controller 4230.

5.4.1.4.2 Pressure Sensor

A pressure sensor 4272 in accordance with the present technology is located in fluid communication with the pneumatic path. An example of a suitable pressure sensor is a transducer from the HONEYWELL ASDX series. An alternative suitable pressure sensor is a transducer from the NPA Series from GENERAL ELECTRIC.

In one form, a signal generated by the pressure sensor 4272 and representing the device pressure Pd is received by the central controller 4230.

5.4.1.4.3 Motor Speed Transducer

In one form of the present technology a motor speed transducer 4276 is used to determine a rotational velocity of the motor 4144 and/or the blower 4142. A motor speed signal from the motor speed transducer 4276 may be provided to the therapy device controller 4240. The motor speed transducer 4276 may, for example, be a speed sensor, such as a Hall effect sensor.

5.4.1.5 Anti-Spill Back Valve

In one form of the present technology, an anti-spill back valve 4160 is located between the humidifier 5000 and the pneumatic block 4020. The anti-spill back valve is constructed and arranged to reduce the risk that water will flow upstream from the humidifier 5000, for example to the motor 4144.

5.4.2 RT Device Electrical Components

5.4.2.1 Power Supply

A power supply 4210 may be located internal or external of the external housing 4010 of the RT device 4000.

In one form of the present technology, power supply 4210 provides electrical power to the RT device 4000 only. In another form of the present technology, power supply 4210 provides electrical power to both RT device 4000 and humidifier 5000.

5.4.2.2 Input Devices

In one form of the present technology, an RT device 4000 includes one or more input devices 4220 in the form of buttons, switches or dials to allow a person to interact with the device. The buttons, switches or dials may be physical devices, or software devices accessible via a touch screen. The buttons, switches or dials may, in one form, be physically connected to the external housing 4010, or may, in another form, be in wireless communication with a receiver that is in electrical connection to the central controller 4230.

In one form, the input device 4220 may be constructed and arranged to allow a person to select a value and/or a menu option.

5.4.2.3 Central Controller

In one form of the present technology, the central controller 4230 is one or a plurality of processors suitable to control an RT device 4000.

Suitable processors may include an x86 INTEL processor, a processor based on ARM® Cortex®-M processor from ARM Holdings such as an STM32 series microcontroller from ST MICROELECTRONIC. In certain alternative forms of the present technology, a 32-bit RISC CPU, such as an STR9 series microcontroller from ST MICROELECTRONICS or a 16-bit RISC CPU such as a processor from the MSP430 family of microcontrollers, manufactured by TEXAS INSTRUMENTS may also be suitable.

In one form of the present technology, the central controller 4230 is a dedicated electronic circuit.

In one form, the central controller 4230 is an application-specific integrated circuit. In another form, the central controller 4230 comprises discrete electronic components.

The central controller 4230 may be configured to receive input signal(s) from one or more transducers 4270, one or more input devices 4220, and the humidifier 5000.

The central controller 4230 may be configured to provide output signal(s) to one or more of an output device 4290, a therapy device controller 4240, a data communication interface 4280, and the humidifier 5000.

In some forms of the present technology, the central controller 4230 is configured to implement the one or more methodologies described herein, such as the one or more algorithms 4300 expressed as computer programs stored in a non-transitory computer readable storage medium, such as memory 4260. In some forms of the present technology, the central controller 4230 may be integrated with an RT device 4000. However, in some forms of the present technology, some methodologies may be performed by a remotely located device. For example, the remotely located device may determine control settings for a ventilator or detect respiratory related events by analysis of stored data such as from any of the sensors described herein.

5.4.2.4 Clock

The RT device 4000 may include a clock 4232 that is connected to the central controller 4230.

5.4.2.5 Therapy Device Controller

In one form of the present technology, therapy device controller 4240 is a therapy control module 4330 that forms part of the algorithms 4300 executed by the central controller 4230.

In one form of the present technology, therapy device controller 4240 is a dedicated motor control integrated circuit. For example, in one form a MC33035 brushless DC motor controller, manufactured by ONSEMI is used.

5.4.2.6 Protection Circuits

The one or more protection circuits 4250 in accordance with the present technology may comprise an electrical protection circuit, a temperature and/or pressure safety circuit.

5.4.2.7 Memory

In accordance with one form of the present technology the RT device 4000 includes memory 4260, e.g., non-volatile memory. In some forms, memory 4260 may include battery powered static RAM. In some forms, memory 4260 may include volatile RAM.

Memory 4260 may be located on the PCBA 4202. Memory 4260 may be in the form of EEPROM, or NAND flash.

Additionally or alternatively, RT device 4000 includes a removable form of memory 4260, for example a memory card made in accordance with the Secure Digital (SD) standard.

In one form of the present technology, the memory 4260 acts as a non-transitory computer readable storage medium on which is stored computer program instructions expressing the one or more methodologies described herein, such as the one or more algorithms 4300.

5.4.2.8 Data Communication Systems

In one form of the present technology, a data communication interface 4280 is provided, and is connected to the central controller 4230. Data communication interface 4280 may be connectable to a remote external communication network 4282 and/or a local external communication network 4284. The remote external communication network 4282 may be connectable to a remote external device 4286. The local external communication network 4284 may be connectable to a local external device 4288.

In one form, data communication interface 4280 is part of the central controller 4230. In another form, data communication interface 4280 is separate from the central controller 4230, and may comprise an integrated circuit or a processor.

In one form, remote external communication network 4282 is the Internet. The data communication interface 4280 may use wired communication (e.g. via Ethernet, or optical fibre) or a wireless protocol (e.g. CDMA, GSM, LTE) to connect to the Internet.

In one form, local external communication network 4284 utilises one or more communication standards, such as Bluetooth, or a consumer infrared protocol.

In one form, remote external device 4286 is one or more computers, for example a cluster of networked computers. In one form, remote external device 4286 may be virtual computers, rather than physical computers. In either case, such a remote external device 4286 may be accessible to an appropriately authorised person such as a clinician.

The local external device 4288 may be a personal computer, mobile phone, tablet or remote control.

5.4.2.9 Output Devices including Optional Display, Alarms

An output device 4290 in accordance with the present technology may take the form of one or more of a visual, audio and haptic unit. A visual display may be a Liquid Crystal Display (LCD) or Light Emitting Diode (LED) display.

5.4.2.9.1 Display Driver

A display driver 4292 receives as an input the characters, symbols, or images intended for display on the display 4294, and converts them to commands that cause the display 4294 to display those characters, symbols, or images.

5.4.2.9.2 Display

A display 4294 is configured to visually display characters, symbols, or images in response to commands received from the display driver 4292. For example, the display 4294 may be an eight-segment display, in which case the display driver 4292 converts each character or symbol, such as the figure "0", to eight logical signals indicating whether the eight respective segments are to be activated to display a particular character or symbol.

5.4.3 RT Device Algorithms

As mentioned above, in some forms of the present technology, the central controller 4230 may be configured to implement one or more algorithms 4300 expressed as computer programs stored in a non-transitory computer readable storage medium, such as memory 4260. The algorithms 4300 are generally grouped into groups referred to as modules.

In other forms of the present technology, some portion or all of the algorithms 4300 may be implemented by a controller of an external device such as the local external device 4288 or the remote external device 4286. In such forms, data representing the input signals and/or intermediate algorithm outputs necessary for the portion of the algorithms 4300 to be executed at the external device may be communicated to the external device via the local external communication network 4284 or the remote external communication network 4282. In such forms, the portion of the algorithms 4300 to be executed at the external device may be expressed as computer programs, such as with processor control instructions to be executed by one or more processor(s), stored in a non-transitory computer readable storage medium accessible to the controller of the external device. Such programs configure the controller of the external device to execute the portion of the algorithms 4300.

In such forms, the therapy parameters generated by the external device via the therapy engine module 4320 (if such forms part of the portion of the algorithms 4300 executed by the external device) may be communicated to the central controller 4230 to be passed to the therapy control module 4330.

5.4.3.1 Pre-Processing Module

A pre-processing module 4310 in accordance with one form of the present technology receives as inputs the signal indicative of the device flow rate Qd from the flow rate sensor 4274 and the signal indicative of the pressure in the pneumatic path proximal to an outlet of the pneumatic block (the device pressure Pd) from the pressure sensor 4272, and performs one or more process steps to calculate one or more output values that will be used as an input to another module, for example a therapy engine module 4320.

Either or both of the input signals indicative of device flow rate Qd and device pressure Pd may be pre-filtered to remove high-frequency noise. In one implementation the filters are low-pass filters with a cutoff frequency of 2 Hz.

In one form of the present technology, the output values include the respiratory flow rate Qr.

In various forms of the present technology, the pre-processing module 4310 comprises one or more of the following algorithms: exit pressure estimation 4312, respiratory flow rate estimation 4316, and coupling parameter estimation 4318.

5.4.3.1.1 Exit Pressure Estimation

In some forms of the present technology, an exit pressure estimation algorithm 4312 estimates the pressure drop through the air circuit 4170 and the nasal cannula 3800 and provides as an output an estimated pressure, Pn, of the airflow just outside the orifices of the cannula prongs 3810*a*, 3810*b*. For example, the controller 4230 may be configured to compute an estimate of an exit pressure Pn representative of a pressure of the air just outside an orifice of the unsealed patient interface with or as a function of (e.g., with one or more functions or equations): (a) a device pressure signal, (b) a device flow rate signal, and (c) a device conductance.

FIG. 7 illustrates a simple circuit model of a flow therapy system. The therapy device 4000 is modelled as a flow source generating an airflow at the device flow rate Qd, which exits the therapy device 4000 at device pressure Pd. The airflow travels through the air circuit 4170 and exits the orifices of the cannula prongs 3810*a*, 3810*b* at an exit pressure Pn. The combined effect of the air circuit 4170 and the cannula 3800, including its prong orifices, on the airflow is modelled by a device conductance Gd. The airflow then divides into a "flushing" portion that flows with respect to ambient at a flow rate referred to as the flushing flow rate Qf, and a portion that is respired by the patient, at the respiratory flow rate Qr. The flushing portion flows to ambient via a patient conductance Gp that is described in more detail below. The flushing flow rate Qf may be negative or positive. By convention, when positive, the flushing flow rate may be understood to be "flushing" out from the system, via the gap(s), to ambient. Correspondingly, when negative, the flushing flow rate flow may be understood to be "entraining" into the system, via the gap(s), from ambient.

The device conductance Gd models the pressure drop between the location of the pressure sensor 4272, which generates the device pressure signal Pd, and the exit of the orifices of the cannula prongs 3810*a*, 3810*b*. In general, the pressure sensor 4272 may be located within the RT device 4000, anywhere in the air circuit 4170, or even within the patient interface 3800, but the signal it generates is still referred to herein as the device pressure Pd.

FIG. 8 is a simplified illustration of one cannula prong 8020 seated within a naris 8010 of the patient when the nasal cannula 3800 is in use. In use, the exit pressure Pn is equal to the pressure within the nasal cavity. The exit pressure Pn is related to the flushing flow rate Qf via the patient conductance Gp, which models the effect of the generally annular flow passage between the end of the cannula prong 8020 and the entrance to the naris 8010. The patient conductance Gp is similar to the "vent conductance" in a vented positive pressure pressure therapy system or the "leak conductance" in an unvented positive pressure therapy system. However, patient conductance Gp is more variable than vent conductance, which is a fixed property of a given vent design, since patient conductance Gp is dependent on the degree of coupling between the cannula prongs and the nares as described in more detail below, and may therefore vary between therapy sessions and even during a therapy session. In addition, the patient conductance Gp is more static than leak conductance, which is transient and highly pressure-dependent.

The respiratory flow rate Qr varies over the respiratory cycle as illustrated in FIG. 6, in which the positive sign is deemed by convention to indicate the inspiratory portion of the cycle. In other words, Qr is positive during inspiration and negative during expiration. The respiratory flow rate Qr, physiologically, must average to zero. That is, the positive (inspiratory) and negative (expiratory) portions of the waveform in FIG. 6 must have equal areas.

From the circuit model in FIG. 7, it is apparent that the device flow rate Qd is equal to the sum of the respiratory flow rate Qr and the flushing flow rate Qf.

$$Q_d = Q_r + Q_f \quad (1)$$

When the nasal cannula 3800 is in use, if the device flow rate Qd exceeds the respiratory flow rate Qr, the flushing flow rate Qf is positive and air flows out of the nares to ambient. If the device flow rate Qd is less than the respiratory flow rate Qr, the flushing flow rate Qf is negative and air flows into the nares from ambient. In this case ambient air is "entrained" by the patient, so the "entrained" flow rate Qen=−Qf is positive.

From the circuit model in FIG. 7, it is apparent that the exit pressure Pn may be computed as the device pressure Pd minus a pressure drop zIP imposed by the device conductance Gd at the device flow rate Qd:

$$P_n = P_d - \Delta P(Q_d, G_d) \quad (2)$$

According to one model, the pressure drop $\Delta P$ may be estimated as a near-quadratic function of the device flow rate Qd, inversely scaled by the device conductance Gd:

$$\Delta P = \frac{Q_d^{\frac{7}{4}} \rho^{\frac{3}{4}}}{G_d} \quad (3)$$

The factor $\rho$, the density of the air, compensates for air density variations with altitude. At sea level and 15° C., the density $\rho$ takes a value of 1.225 kilograms per cubic metre.

In one implementation, the exit pressure estimation algorithm 4312 applies equations (2) and (3) to the device flow rate Qd and the device pressure Pd to estimate the exit pressure Pn, using a value Gd for the device conductance.

In some forms of the present technology, the device conductance Gd may be estimated by a calibration process operated by the controller that may be carried out while the nasal cannula 3800 is disconnected from the patient, i.e. when the exit pressure Pn is identically zero. Such a calibration process may comprise setting a device flow rate Qd, measuring the resulting device pressure Pd, and repeating N times for different values of Qd. Since the exit pressure Pn in equation (2) is zero, a near-quadratic model may be obtained from equation (3) to model the relationship between each of the N pairs (Qdi, Pdi) of measurements (i=1, . . . N):

$$P_{di} = \frac{Q_{di}^{\frac{7}{4}} \rho^{\frac{3}{4}}}{G_d} \quad (4)$$

A best-fit value for the device conductance Gd may then be fitted to the N pairs (Qdi, Pdi) using the near-quadratic model of equation (4).

5.4.3.1.2 Respiratory Flow Rate Estimation

In one form of the present technology, a respiratory flow rate estimation algorithm 4316 receives as an input the exit pressure Pn estimated by the exit pressure estimation algorithm 4312 and provides as an output an estimate of the respiratory flow rate Qr.

From equation (1), it is apparent that the respiratory flow rate Qr is equal to the difference between the device flow rate Qd and the flushing flow rate Qf:

$$Q_r = Q_d - Q_f \quad (5)$$

Thus, the controller 4230 may be configured to compute an estimate of respiratory flow rate for a patient based on or as a function of (a) a flushing flow rate, and (b) a device flow rate, which function may be based on a coupling parameter as discussed in more detail herein. For example, the respiratory flow rate estimation algorithm 4316 may first estimate the flushing flow rate Qf from the exit pressure Pn, then subtract the flushing flow rate Qf from the device flow rate Qd to obtain the respiratory flow rate Qr according to example equation (5).

As mentioned above, the relationship Qf(Pn) between the flushing flow rate Qf and the exit pressure Pn may be determined by the patient conductance Gp. The patient conductance Gp models the effect of the generally annular flow passage between the end of the cannula prongs and the entrance to the nares. The patient conductance Gp varies depending on the degree of coupling between the cannula prongs and the nares. Thus, the flushing flow rate Qf may be determined or computed based on, or as a function of, a coupling parameter that characterizes the degree of coupling between the prongs and nares. The coupling parameter may be applied to adjust a patient conductance to vary the patient conductance in relation to the changing nature of the coupling. For example, the controller 4230 may be configured to compute an estimate of a flushing flow rate based on or as a function of (a) a patient conductance, and (b) a coupling parameter that characterizes a degree of coupling between the patient interface and the patient's nares. This may also be a function of the estimated exit pressure Pn. Such a coupling parameter C may be defined to model the degree of coupling between the cannula and the nares. When the nasal cannula 3800 is not in use, the exit pressure Pn is identically zero (ambient pressure), so the patient conductance Gp is infinite and the coupling parameter C may be defined to be zero. When the nasal cannula 3800 completely seals with the nares, the flushing flow rate Qf is identically zero, so the patient conductance Gp is zero, and the coupling parameter C may be defined to be infinite. The coupling parameter C may be defined to be unity, and the patient conductance to be an "ideal" value $Gp_1$, when the nasal cannula is ideally coupled with the patient's nares. The patient conductance Gp for any degree of coupling may then be modelled as the ideal value $Gp_1$ divided by the coupling parameter C:

$$G_p = \frac{G_{p_1}}{C} \tag{6}$$

FIG. 9 is a graph illustrating the relationship Qf(Pn) between the flushing flow rate Qf and the exit pressure Pn with different curves 9010, 9020, 9030 corresponding to different degrees of coupling at a constant device flow rate Qd. The upper half of the curves 9010, 9020, 9030 corresponds to a positive flushing flow rate Qf (and positive exit pressure Pn) when Qd exceeds Qr, while the lower half corresponds to a positive entrained flow rate Qen (and negative exit pressure Pn) when Qr exceeds Qd.

The curve 9010 corresponds to a loosely coupled cannula with a low value of the coupling parameter C and hence high patient conductance Gp. The curve 9020 corresponds to tighter coupling and a higher value of the coupling parameter C than for the curve 9010. The curve 9030 corresponds to still tighter coupling and a higher value of the coupling parameter C than for the curve 9020 and hence lower patient conductance Gp. (When C is zero (uncoupled), the curve coincides with the y-axis as Pn is identically zero. Moreover, when C is infinite (sealed), the curve coincides with the x-axis as Qf is identically zero.)

Over the respiratory cycle, the flushing flow rate Qf oscillates along one of the curves Qf(Pn) around the quiescent point Qf=Qd (when Qr is zero), moving down the curve during inspiration and up the curve during expiration. When C is zero (uncoupled), the oscillation has zero amplitude.

A first approximation to each curve Qf(Pn) is analogous to the near-quadratic model of equation (3) relating device flow rate to pressure drop across the air circuit:

$$Q_f = (G_p P_n)^{\frac{4}{7}} \rho^{\frac{3}{7}} \tag{7}$$

A first adjustment to this approximation takes into account the fact that the positive and negative halves of the curves $Q_f(P_n)$ are dissimilar, as if a different patient conductance Gp prevails depending on whether the system is flushing air to ambient ($P_n$, $Q_f>0$, $Q_{en}<0$) or entraining air from ambient ($P_n<0$, $Q_{en}>0$, $Q_f<0$). This effect may be modelled by a (dimensionless) fluid dynamics asymmetry coefficient $f_1$ that scales the patient conductance Gp when the exit pressure Pn is positive (the flushing half). A second approximation to each curve Qf(Pn) may therefore be written as $$Q_f = (f_1 G_p P_n)^{\frac{4}{7}} \rho^{\frac{3}{7}}, P_n > 0 = -(G_p(-P_n))^{\frac{4}{7}} \rho^{\frac{3}{7}}, P_n < 0 \tag{8}$$

A typical value of the fluid dynamics asymmetry coefficient $f_1$ is 0.83.

Another effect to be modelled is that of the device flow rate Qd. FIG. 10 is a graph illustrating the relationship Qf(Pn) with different curves 1010, 1020, 1030 corresponding to different device flow rates Qd for a constant degree of coupling. In the lower (entraining) half, all three curves coincide, indicating that the device flow rate Qd has no effect on the relationship of exit pressure to entrained flow rate. In the upper (flushing) half, the curves diverge as Qd varies. When Qd is low, the curve 1030 is flat, corresponding to tight coupling of the cannula within the nares. As Qd increases, the curves 1020, 1030 get steeper, corresponding to looser coupling, though the geometry has not changed. Increasing Qd therefore has an "uncoupling" effect for a given seating of the cannula within the nares, but only on the flushing half of the characteristic. This may likely be a result of the different fluid dynamics pertaining to the upper (flushing) and lower (entraining) halves of the graph. In the lower (entraining) half the respiratory flow is in the same direction as the device flow leaving the cannula orifice, and flow lines originating from the cannula and from the outside air converge. In the upper (flushing) half, relatively high-velocity air leaving the cannula orifice meets counter flow within the nasal cavity and these two interacting airflows give rise to a high degree of turbulence and vorticity. It is these complex flow dynamics that give rise to the "uncoupling" effect of increasing Qd.

This effect may be modelled by applying a scaling factor to positive flushing flow rates Qf, to produce an adjusted or approximate flushing flow rate $\tilde{Q}_f$. The scaling factor may depend on the device flow rate Qd via a fluid dynamics uncoupling coefficient $f_0$:

$$\tilde{Q}_f = Q_f(1+f_0 Q_d), Q_f > 0 \tag{9}$$

A small negative value for the fluid dynamics uncoupling coefficient $f_0$, meaning a scaling factor of slightly less than unity for a positive device flow rate Qd, and hence $\tilde{Q}_f < Q_f$, will have the effect illustrated in FIG. 10.

The effect of the fluid dynamics uncoupling coefficient $f_0$ may be modelled as proportional to the degree of coupling, since the uncoupling effect of device flow rate disappears when the nasal cannula is completely uncoupled. In other words, the fluid dynamics uncoupling coefficient $f_0$ for any degree of coupling may be modelled as the product of an "ideal" value $f_{01}$ and the coupling parameter C:

$$f_0 = C f_{01} \tag{10}$$

Putting the adjustment of equation (9) into the two-part approximation of equation (8) gives third approximation to the relationship between the flushing flow rate Qf and the exit pressure Pn as follows:

$$Q_f = \frac{(f_1 G_p P_n)^{\frac{4}{7}} \rho^{\frac{3}{7}}}{1 + f_0 Q_d}, P_n > 0 = -(G_p(-P_n))^{\frac{4}{7}} \rho^{\frac{3}{7}}, P_n < 0 \tag{11}$$

FIG. 11 is a flow chart illustrating a method 1100 of estimating the respiratory flow rate from the device flow rate Qd and the device pressure Pd, as may be implemented by the respiratory flow rate estimation algorithm 4316 in some implementations of the present technology. The method 1100 may start at step 1110, which uses the device flow rate Qd and the device pressure Pd to estimate the exit pressure Pn using the device conductance Gd and, for example, equations (2) and (3). Thus, the process at step 1110 may compute the estimate of exit pressure Pn from the device pressure Pd, which may be a filtered signal (e.g., low pass filtered), the device flow rate Qd, which may also be a filtered signal (e.g., low pass filtered) and a determined device conductance Gd.

Next the flushing flow rate Qf may be estimated as a function of a coupling parameter as previously discussed. For example, at the step 1120 the method 1100 may estimate the flushing flow rate Qf from the estimated exit pressure Pn and the device flow rate Qd, using the ideal patient conductance $Gp_1$, the fluid dynamics coefficients $f_0$ and $f_1$, and the coupling parameter C, by using, for example, equations (6) and (11). The process of step 1120 may compute an estimate of the flushing flow rate Qf as a function of the device flow rate Qd (e.g., a filtered signal thereof as previously mentioned), the computed estimate of exit pressure Pn, the ideal patient conductance $Gp_1$, the fluid dynamics coefficients $f_0$ and $f_1$, and the coupling parameter C. The coupling parameter C may be computed from the coupling parameter estimation algorithm 4318 described below, or if an output from that algorithm is not yet computed, an initial value of 1 may be used for the coupling parameter C.

At step 1130, the method 1100 may then compute, such as by subtraction, the estimated flushing flow rate Qf from the device flow rate Qd to obtain the respiratory flow rate Qr.

In some forms of the present technology, the ideal patient conductance $Gp_1$ and the ideal fluid dynamics uncoupling coefficient $f_{01}$ may be estimated by a calibration process that may be carried out by the controller while the nasal cannula 3800 is ideally coupled with the patient's nares (so the coupling parameter C is one). In one implementation, ideal coupling occurs when the cross-section of the cannula orifice is 70% of the cross-sectional area of the nasal cavity level with the orifice. Such a calibration process may comprise prompting, such as with an output of the controller (e.g., on a display) the patient to hold his or her breath (so the respiratory flow rate Qr is zero), setting a (positive) device flow rate Qd, measuring the device pressure Pd, estimating the exit pressure Pn (via the exit pressure estimation algorithm 4312) and repeating N times for different (positive) values of Qd. Since the respiratory flow rate Qr is zero, the flushing flow rate Qf is equal to the device flow rate Qd at each measurement.

Best-fit values for the ideal patient conductance $Gp_1$ and the ideal fluid dynamics uncoupling coefficient $f_{01}$ may then be fitted by the controller to the N pairs (Qdi, Pni) using the following relation derived from the positive half of equation (11) with the coupling parameter C set to one:

$$Q_{di}(1 + f_{01} Q_{di}) = (f_1 G_{p_1} P_{ni})^{\frac{4}{7}} \rho^{\frac{3}{7}} \quad (12)$$

along with known values for the density p and the fluid dynamics asymmetry coefficient $f_1$.

5.4.3.1.3 Coupling Parameter Estimation

In one form of the present technology, the controller may control a process to compute one or more estimates of the coupling parameter during use such as by operating a coupling parameter estimation algorithm 4318. Such an algorithm may receive as an input the estimated respiratory flow rate Qr from the respiratory flow rate estimation algorithm 4316 and returns an estimate of the coupling parameter C.

In one implementation, the coupling parameter C may be estimated by a control loop process such as a PID controller (e.g., a proportional-integral (PI) controller). Such a controller may have an input (a feedback input) of the estimated respiratory flow rate Qr. The controller takes advantage of the fact that the true respiratory flow rate Qr must have a long-term average of zero. In an example, a PI controller may therefore apply a lowpass (averaging) filter with a time constant of multiple breaths to the respiratory flow rate Qr, and apply a correction to the coupling parameter C proportional to the result.

FIG. 12 is a flow chart illustrating a method 1200 of estimating the coupling parameter C from the respiratory flow rate Qr estimated by the respiratory flow rate estimation algorithm 4316, as may be implemented by the coupling parameter estimation algorithm 4318 in some implementations of the present technology. The method 1200 may start at step 1210, which applies a lowpass (averaging) filter with a time constant of on an order of multiple breaths (e.g., any of two, three, four or more) to the respiratory flow rate Qr. Step 1220 then scales the lowpass filtered version of the respiratory flow rate Qr by a proportional scaling constant $K_p$, while step 1230 scales the integral of the lowpass filtered version of the respiratory flow rate Qr by a proportional scaling constant $K_i$. The two scaled amounts are added at the summing step 1240 to produce a correction $\Delta C$ which may be applied to the current estimate of the coupling parameter C. Suitable values for the scaling constants $K_p$ and $K_i$ may be predetermined empirically. In one example implementation, $K_p$ and $K_i$ may be set to 0.005 and 0.05 respectively.

FIG. 13 contains a set of graphs illustrating the outputs of the respiratory flow rate estimation algorithm 4316 and the coupling parameter estimating algorithm 4318. The top graph 1310 shows device pressure Pd, unfiltered PdU and filtered PdF. The second graph 1320 shows device flow rate Qd, unfiltered QdU and filtered QdF. The third graph 1330 shows the true respiratory flow rate Qr_true alongside the estimate Qr_est provided by the algorithm 4316 based on the filtered device flow rate QdF and filtered device pressure PdF. It is notable that the estimated respiratory flow rate Qr_est is an accurate estimate of the true respiratory flow rate Qr_true, with a slight delay as a result of the filtering. The bottom graph 1340 shows the coupling parameter C as estimated by the algorithm 4318 based on the filtered device flow rate QdF and filtered device pressure PdF. The estimated coupling parameter is initialised to one and decreases gradually before stabilising at around 0.8, indicating the coupling is slightly looser than the ideal coupling at which the system was calibrated.

If the calibration of the ideal patient conductance $Gp_1$ or the ideal fluid dynamics uncoupling coefficient $f_{01}$ is inaccurate, or the value of the fluid dynamics asymmetry coefficient $f_1$ is inappropriate, the accuracy of the estimate of the respiratory flow rate Qr will be affected. The estimation of the coupling parameter C via PI control based on the average respiratory flow rate Qr ensures that there will not be a DC offset in the estimated respiratory flow rate Qr, but the estimate of Qr may be scaled by an unknown constant from the actual respiratory flow rate. In other words, the estimate of Qr may still accurately reflect the shape of the actual respiratory flow rate Qr, even if the actual amplitude is inaccurate. The respiratory flow rate estimation algorithm 4316 may therefore be regarded as estimating the breathing pattern of the patient, where the breathing pattern is the respiratory flow rate scaled by an unknown constant. For simplicity, the output of the respiratory flow rate estimation algorithm 4316 that is passed to the therapy engine module 4320 is referred to below as the respiratory flow rate Qr.

FIG. 14 contains a further set of graphs illustrating the outputs of the respiratory flow rate estimation algorithm 4316 and the coupling parameter estimating algorithm 4318. The top graph 1410 shows device pressure Pd, unfiltered PdU and filtered PdF. The second graph 1420 shows device flow rate Qd, unfiltered QdU and filtered QdF. The third graph 1430 shows the true respiratory flow rate Qr_true alongside the estimate Qr_est provided by the algorithm 4316 based on the filtered device flow rate QdF and filtered device pressure PdF. The estimated respiratory flow rate Qr_est is an accurate estimate of the breathing pattern of the true respiratory flow rate Qr_true, with a slight delay as a result of the filtering. The bottom graph 1440 shows the coupling parameter C as estimated by the algorithm 4318 based on the filtered device flow rate QdF and filtered device pressure PdF. The estimated coupling parameter is stable at around 1.4, indicating the coupling is slightly tighter than the ideal coupling at which the system was calibrated.

The estimation of the coupling parameter provides the present technology with robustness to variations between and within therapy sessions that previous high flow therapy monitoring techniques could only handle by recalibration. The variable patient conductance Gp models the variable interaction between the cannula prongs and the nares. The coupling parameter substantially captures that variability and allows the values of the other parameters such as the ideal patient conductance and the fluid dynamics coefficients obtained during calibration to continue to be used throughout flow therapy.

5.4.3.2 Therapy Engine Module

In one form of the present technology, a therapy engine module 4320 receives as inputs one or more of an exit pressure Pn at the exit of the nasal cannula 3800, a flushing flow rate Qf, and a respiratory flow rate of air to the patient, Qr, from the pre-processing module 4310 and provides as an output one or more therapy parameters.

In various forms, the therapy engine module 4320 comprises one or more of the following algorithms: phase determination 4321, ventilation determination 4323, inspiratory flow limitation determination 4324, apnea/hypopnea detection 4325, periodic breathing detection 4326, and therapy parameter determination 4329.

5.4.3.2.1 Phase Determination

In one form of the present technology, a phase determination algorithm 4321 receives as an input a signal indicative of respiratory flow rate, Qr, and provides as an output a phase Φ of a current breathing cycle of a patient 1000.

In some forms, known as discrete phase determination, the phase output Φ is a discrete variable. One implementation of discrete phase determination provides a bi-valued phase output Φ with values of either inhalation or exhalation, for example represented as values of 0 and 0.5 revolutions respectively, upon detecting the start of spontaneous inhalation and exhalation respectively. RT devices 4000 that "trigger" and "cycle" effectively perform discrete phase determination, since the trigger and cycle points are the instants at which the phase changes from exhalation to inhalation and from inhalation to exhalation, respectively. In one implementation of bi-valued phase determination, the phase output Φ is determined to have a discrete value of 0 (thereby "triggering" the RT device 4000) when the respiratory flow rate Qr has a value that exceeds a positive threshold, and a discrete value of 0.5 revolutions (thereby "cycling" the RT device 4000) when a respiratory flow rate Qr has a value that is more negative than a negative threshold. The inhalation time Ti and the exhalation time Te may be estimated as typical values over many respiratory cycles of the time spent with phase Φ equal to 0 (indicating inspiration) and 0.5 (indicating expiration) respectively.

Another implementation of discrete phase determination provides a tri-valued phase output Φ with a value of one of inhalation, mid-inspiratory pause, and exhalation.

In other forms, known as continuous phase determination, the phase output Φ is a continuous variable, for example varying from 0 to 1 revolutions, or 0 to $2\pi$ radians. RT devices 4000 that perform continuous phase determination may trigger and cycle when the continuous phase reaches 0 and 0.5 revolutions, respectively. In one implementation of continuous phase determination, a continuous value of phase Φ is determined using a fuzzy logic analysis of the respiratory flow rate Qr. A continuous value of phase determined in this implementation is often referred to as "fuzzy phase".

In another implementation of continuous phase determination, the phase Φ is first discretely estimated from the respiratory flow rate Qr as described above, as are the inhalation time Ti and the exhalation time Te. The continuous phase Φ at any instant may be determined as the half the proportion of the inhalation time Ti that has elapsed since the previous trigger instant, or 0.5 revolutions plus half the proportion of the exhalation time Te that has elapsed since the previous cycle instant (whichever instant was more recent).

5.4.3.2.2 Ventilation Determination

In one form of the present technology, a ventilation determination algorithm 4323 receives an input a respiratory flow rate Qr, and determines a measure indicative of current patient ventilation, Vent.

In some implementations, the ventilation determination algorithm 4323 determines a measure of ventilation Vent that is an estimate of actual patient ventilation. One such implementation is to take half the absolute value of respiratory flow rate, Qr, optionally filtered by low-pass filter such as a second order Bessel low-pass filter with a corner frequency of 0.11 Hz.

In other implementations, the ventilation determination algorithm 4323 determines a measure of ventilation Vent that is broadly proportional to actual patient ventilation. One such implementation estimates peak respiratory flow rate Qpeak over the inspiratory portion of the cycle. This and many other procedures involving sampling the respiratory flow rate Qr produce measures which are broadly proportional to ventilation, provided the flow rate waveform shape does not vary very much (here, the shape of two breaths is taken to be similar when the flow rate waveforms of the breaths normalised in time and amplitude are similar). Some simple examples include the median positive respiratory flow rate, the median of the absolute value of respiratory flow rate, and the standard deviation of flow rate. Arbitrary linear combinations of arbitrary order statistics of the absolute value of respiratory flow rate using positive coefficients, and even some using both positive and negative coefficients, are approximately proportional to ventilation. Another example is the mean of the respiratory flow rate in the middle K proportion (by time) of the inspiratory portion, where 0<K<1. There is an arbitrarily large number of measures that are exactly proportional to ventilation if the flow rate shape is constant.

5.4.3.2.3 Inspiratory Flow Limitation Determination

In one form of the present technology, the central controller 4230 executes an inspiratory flow limitation determination algorithm 4324 for the of the extent of inspiratory flow limitation.

In one form, the inspiratory flow limitation determination algorithm 4324 receives as an input a respiratory flow rate signal Qr and provides as an output a metric of the extent to which the inspiratory portion of the breath exhibits inspiratory flow limitation.

In one form of the present technology, the inspiratory portion of each breath is identified by a zero-crossing detector. A number of evenly spaced points (for example, sixty-five), representing points in time, are interpolated by an interpolator along the inspiratory flow rate-time curve for each breath. The curve described by the points is then scaled by a scalar to have unity length (duration/period) and unity area to remove the effects of changing breathing rate and depth. The scaled breaths are then compared in a comparator with a pre-stored template representing a normal unobstructed breath, similar to the inspiratory portion of the breath shown in FIG. 6. Breaths deviating by more than a specified threshold (typically 1 scaled unit) at any time during the inspiration from this template, such as those due to coughs, sighs, swallows and hiccups, as determined by a test element, are rejected. For non-rejected data, a moving average of the first such scaled point is calculated by the central controller 4230 for the preceding several inspiratory events. This is repeated over the same inspiratory events for the second such point, and so on. Thus, for example, sixty five scaled data points are generated by the central controller 4230, and represent a moving average of the preceding several inspiratory events, e.g., three events. The moving average of continuously updated values of the (e.g., sixty five) points are hereinafter called the "scaled flow rate", designated as $Qs(t)$. Alternatively, a single inspiratory event can be utilised rather than a moving average.

From the scaled flow rate, two shape factors relating to the determination of partial obstruction may be calculated.

Shape factor 1 is the ratio of the mean of the middle (e.g. thirty-two) scaled flow rate points to the mean overall (e.g. sixty-five) scaled flow rate points. Where this ratio is in excess of unity, the breath will be taken to be normal. Where the ratio is unity or less, the breath will be taken to be obstructed. A ratio of about 1.17 is taken as a threshold between partially obstructed and unobstructed breathing, and equates to a degree of obstruction that would permit maintenance of adequate oxygenation in a typical patient.

Shape factor 2 is calculated as the RMS deviation from unit scaled flow rate, taken over the middle (e.g. thirty two) points. An RMS deviation of about 0.2 units is taken to be normal. An RMS deviation of zero is taken to be a totally flow-limited breath. The closer the RMS deviation to zero, the breath will be taken to be more flow limited.

Shape factors 1 and 2 may be used as alternatives, or in combination. In other forms of the present technology, the number of sampled points, breaths and middle points may differ from those described above. Furthermore, the threshold values can be other than those described.

5.4.3.2.4 Apnea/Hypopnea Detection

In one form of the present technology, the central controller 4230 executes an apnea/hypopnea detection algorithm 4325 for the detection of apneas and/or hypopneas.

In one form, the apnea/hypopnea detection algorithm 4325 receives as an input a respiratory flow rate signal Qr and provides as an output a flag that indicates that an apnea or a hypopnea has been detected.

In one form, an apnea will be said to have been detected when a function of respiratory flow rate Qr falls below a flow rate threshold for a predetermined period of time. The function may determine a peak flow rate, a relatively short-term mean flow rate, or a flow rate intermediate of relatively short-term mean and peak flow rate, for example an RMS flow rate. The flow rate threshold may be a relatively long-term measure of flow rate.

In one form, a hypopnea will be said to have been detected when a function of respiratory flow rate Qr falls below a second flow rate threshold for a predetermined period of time. The function may determine a peak flow, a relatively short-term mean flow rate, or a flow rate intermediate of relatively short-term mean and peak flow rate, for example an RMS flow rate. The second flow rate threshold may be a relatively long-term measure of flow rate. The second flow rate threshold is greater than the flow rate threshold used to detect apneas.

5.4.3.2.5 Periodic Breathing Detection

In one form of the present technology, the central controller 4230 executes a periodic breathing detection algorithm 4326 for the detection of periodic breathing such as Cheyne-Stokes Respiration (CSR).

In one form, the periodic breathing detection algorithm 4326 receives as an input a respiratory flow rate signal Qr and provides as an output a flag that indicates that periodic breathing has been detected.

A variety of techniques for detecting periodic breathing may be implemented by the periodic breathing detection algorithm 4326. In one implementation, the periodic breathing detection algorithm 4326 uses the method of detecting periodic breathing described in PCT Patent Publication no. WO2015/120521, titled "Real-time detection of periodic breathing", the entire contents of which are herein incorporated by reference.

5.4.3.2.6 Determination of Therapy Parameters

In some forms of the present technology, the central controller 4230 executes one or more therapy parameter determination algorithms 4329 for the determination of one or more therapy parameters using the values returned by one or more of the other algorithms in the therapy engine module 4320. In some forms of the present technology, the therapy parameter is a treatment flow rate Qt.

As discussed in more detail herein, a determination of respiratory flow rate Qr that is based on the coupling parameter C, and/or the flushing flow rate Qf, may then be applied in the control of the RT device 4000 such as for making operational control changes of the RT device 4000. For example, the controller 4230 may change the treatment flow rate Qt that controls a generated flow therapy based on the determined respiratory flow rate Qr. In some such examples, such an operational change may be based on a determination or detection of respiratory events (e.g., any one or more of flow limitation, apnea, hypopnea, inspiration, expiration, ventilation, etc.) of the user that are detected by the controller 4230 implementing an assessment of, or based on, the determined respiratory flow rate Qr signal. In another example, the controller 4230 may change the treatment flow rate Qt based on the determined flushing flow rate Qf.

In one such form, the therapy parameter determination algorithm 4329 takes as input any apneas/hypopneas detected by the apnea/hypopnea detection algorithm 4325 and adjusts the treatment flow rate Qt in response to the detected apneas/hypopneas. In one example, the therapy parameter determination algorithm 4329 may increase the treatment flow rate Qt in response to detected apneas/hypopneas, and progressively decrease the treatment flow rate Qt (down to a predetermined floor) in the absence of detected apneas/hypopneas.

In another such form, the therapy parameter determination algorithm 4329 takes as input the respiratory flow rate Qr estimated by the respiratory flow rate estimation algorithm 4316, and adjusts the treatment flow rate Qt to exceed the peak respiratory flow rate Qpeak. This ensures the flushing flow rate Qf is always positive, which in turn ensures the patient receives 100% conditioned air from the humidifier 5000, undiluted by unconditioned ambient air. This ensures the flow therapy meets the conventional definition of high flow therapy.

By improving the efficiency of a patient's ventilation, and thereby temporarily destabilising the patient's internal respiratory control loop, HFT can induce periodic breathing. Reduction of the treatment flow rate Qt in response to instances of periodic breathing can reduce this effect and thereby ameliorate the periodic breathing. In another such form, the therapy parameter determination algorithm 4329 takes as input any instances of periodic breathing detected by the periodic breathing detection algorithm 4326, and reduces the treatment flow rate Qt in response to the detected instances. The therapy parameter determination algorithm 4329 may gradually increase the treatment flow rate Qt (up to a predetermined ceiling) in response to the absence of detected instances of periodic breathing.

5.4.3.3 Therapy Control Module

The therapy control module 4330 in accordance with one aspect of the present technology receives as inputs the therapy parameters from the therapy parameter determination algorithm 4329 of the therapy engine module 4320, and controls the pressure generator 4140 to deliver a flow of air in accordance with the therapy parameters.

In the form of the present technology in which the therapy parameter is a treatment flow rate Qt, the therapy control module 4330 controls the pressure generator 4140 to deliver a flow of air at a device flow rate Qd equal to the treatment flow rate Qt.

5.4.3.4 Detection of Fault Conditions

In one form of the present technology, the central controller 4230 executes one or more fault condition detection methods 4340. The fault conditions detected by the one or more methods 4340 may include at least one of the following:

Power failure (no power, or insufficient power)
Transducer fault detection
Failure to detect the presence of a component
Operating parameters outside recommended ranges (e.g. pressure, flow rate, temperature, $PaO_2$)
Failure of a test alarm to generate a detectable alarm signal.

Upon detection of the fault condition, the corresponding method 4340 signals the presence of the fault by one or more of the following:

Initiation of an audible, visual &/or kinetic (e.g. vibrating) alarm
Sending a message to an external device
Logging of the incident

5.4.3.5 Reporting

In one form of the present technology, the central controller 4230 executes a reporting module 4350 to report breathing parameters or events estimated or detected by the therapy engine 4320 or the pre-processing module 4310. The reporting module 4350 may log the parameters or events to memory 4260 that is configured for later removal and analysis. Alternatively, or additionally, the reporting module 4350 may communicate the parameters or events to an external computing device, e.g. the local external device 4288 or the remote external device 4286 via an external communication network.

The parameters or events reported by the reporting module 4350 may include at least one of the following:

Respiratory flow rate Qr
Coupling parameter C
Apneas/hypopneas
Flow limitation instances
Periodic breathing instances In particular, the coupling parameter C can act as a continuously-valued indicator of therapy efficacy. Previous indicators of high flow therapy usage have been binary in nature, indicating that the patient either is or is not using the therapy. For example, a value of 1 for the coupling parameter C indicates the therapy is being delivered with ideal efficacy, a value of 0 indicates no efficacy at all as the cannula is completely uncoupled, and a value in between 0 and 1, possibly caused by a slight dislocation of the cannula from its ideal seating within the nares, indicates intermediate efficacy.

The reporting module 4350 may log a sequence of the values of the coupling parameter C at regular intervals over a therapy session, and a summary of the sequence such as an average coupling parameter over the session. The reporting module 4350 may also detect in real time whether the coupling parameter C goes outside predetermined limits of effective therapy, such as by implementing (e.g., by the controller 4230) one or more comparisons between the coupling parameter C and one or more threshold values, and indicating either insufficient or excessive coupling. The latter condition is of particular concern in pediatric respiratory care. The reporting module 4350 may then signal the presence of the departure by one or more of the following:

Initiation of an audible, visual &/or kinetic (e.g. vibrating) alarm
Sending a message to an external computing device
Logging of the incident to memory 4260.

5.5 Air Circuit

An air circuit 4170 in accordance with an aspect of the present technology is a conduit or a tube constructed and arranged to allow, in use, a flow of air to travel between two components such as RT device 4000 and the patient interface 3800.

In particular, the air circuit 4170 may be in fluid connection with the outlet of the pneumatic block 4020 and the patient interface. The air circuit may be referred to as an air delivery tube. In some cases there may be separate limbs of the circuit for inhalation and exhalation. In other cases a single limb is used.

In some forms, the air circuit 4170 may comprise one or more heating elements configured to heat air in the air circuit, for example to maintain or raise the temperature of the air. The heating element may be in a form of a heated wire circuit, and may comprise one or more transducers, such as temperature sensors. In one form, the heated wire circuit may be helically wound around the axis of the air circuit 4170. The heating element may be in communication with a controller such as a central controller 4230. One example of an air circuit 4170 comprising a heated wire circuit is described in U.S. Pat. No. 8,733,349, which is incorporated herewithin in its entirety by reference.

5.5.1 Supplementary Gas Delivery

In one form of the present technology, supplementary gas, e.g. oxygen, 4180 is delivered to one or more points in the pneumatic path, such as upstream of the pneumatic block 4020, to the air circuit 4170 and/or to the patient interface 3000 or 3800.

5.6 Humidifier

5.6.1 Humidifier Overview

In one form of the present technology there is provided a humidifier 5000 (e.g. as shown in FIG. 5A) to change the absolute humidity of air or gas for delivery to a patient relative to ambient air. Typically, the humidifier 5000 is used to increase the absolute humidity and increase the temperature of the flow of air (relative to ambient air) before delivery to the patient's airways.

The humidifier 5000 may comprise a humidifier reservoir 5110, a humidifier inlet 5002 to receive a flow of air, and a humidifier outlet 5004 to deliver a humidified flow of air. In some forms, as shown in FIG. 5A and FIG. 5B, an inlet and an outlet of the humidifier reservoir 5110 may be the humidifier inlet 5002 and the humidifier outlet 5004 respectively. The humidifier 5000 may further comprise a humidifier base 5006, which may be adapted to receive the humidifier reservoir 5110 and comprise a heating element 5240.

5.7 Respiratory Therapy Modes

Various respiratory therapy modes may be implemented by the disclosed respiratory therapy system.

5.7.1 High Flow Therapy

In some forms of respiratory therapy, the central controller 4230 controls the pressure generator 4140 to deliver a flow of air whose device flow rate Qd is controlled to a treatment or target flow rate Qt that is typically positive throughout the patient's breathing cycle. Such forms are generally grouped under the heading of flow therapy. In flow therapy, the treatment flow rate Qt may be a constant value that is hard-coded or manually entered to the RT device 4000. If the treatment flow rate Qt is sufficient to exceed the patient's peak inspiratory flow rate, the therapy is generally referred to as high flow therapy (HFT). Alternatively, the treatment flow rate may be a profile Qt(t) that varies over the respiratory cycle.

5.8 Technology Examples

Implementations of the aforementioned technology may be considered in relation to the following additional numbered examples thereof.

Example 1

A method of estimating a breathing pattern of a patient receiving flow therapy from a respiratory therapy device via an unsealed patient interface, the method comprising:
  providing a device flow rate signal representative of a flow rate of air being delivered by the respiratory therapy device;
  providing a device pressure signal representative of a pressure of the air being delivered by the respiratory therapy device,
  estimating an exit pressure representative of a pressure of the air just outside an orifice of the unsealed patient interface, using the device pressure signal and the device flow rate signal along with a device conductance,
  estimating a flushing flow rate from the exit pressure using a patient conductance and a coupling parameter modelling the degree of coupling between the patient interface and the patient's nares, and
  subtracting the flushing flow rate from the device flow rate to estimate the breathing pattern of the patient.

Example 2

The method of example 1, wherein the patient conductance models the interaction between the unsealed patient interface and the nares of the patient.

Example 3

The method of example 2, wherein the patient conductance is an ideal patient conductance divided by the coupling parameter.

Example 4

The method of example 3, wherein the ideal patient conductance is the patient conductance when the unsealed patient interface is ideally coupled with the patient's nares.

Example 5

The method of any one of examples 1 to 4, wherein estimating the exit pressure takes into account a density of the air being delivered by the respiratory therapy device.

Example 6

The method of any one of examples 1 to 5, wherein estimating the flushing flow rate takes into account a density of the air.

Example 7

The method of any one of examples 1 to 6, wherein the patient conductance is scaled by a fluid dynamics asymmetry coefficient when the exit pressure is positive.

Example 8

The method of any one of examples 1 to 7, wherein estimating the flushing flow rate comprises applying a scaling factor to the flushing flow rate when the exit pressure is positive, wherein the scaling factor is dependent on the device flow rate signal.

Example 9

The method of example 8, wherein the scaling factor further depends on a fluid dynamics uncoupling coefficient that scales the device flow rate.

Example 10

The method of example 9, wherein the fluid dynamics uncoupling coefficient is proportional to the coupling parameter.

Example 11

The method of any one of examples 1 to 10, further comprising estimating the coupling parameter using the estimated breathing pattern of the patient.

Example 12

The method of example 11, wherein estimating the coupling parameter uses a proportional-integral controller.

Example 13

The method of example 12, wherein the proportional-integral controller applies a correction to the coupling parameter that is computed from a lowpass filtered version of the estimated breathing pattern.

Example 14

The method of any one of examples 11 to 13, further comprising reporting the estimated coupling parameter as a continuously-valued indicator of the usage of the flow therapy by the patient.

Example 15

A respiratory therapy system comprising:
a respiratory therapy device comprising a blower configured to deliver a flow of air at a controlled flow rate;
a memory; and
a processor configured by processing instructions stored in the memory to execute a method of estimating a breathing pattern of a patient receiving the flow of air via an unsealed patient interface, the method comprising:
providing a device flow rate signal representative of a flow rate of the air being delivered by the respiratory therapy device;
providing a device pressure signal representative of the pressure of the air being delivered by the respiratory therapy device,
estimating an exit pressure representative of a pressure of the air just outside an orifice of the unsealed patient interface, using the device pressure signal and the device flow rate signal along with a device conductance,
estimating a flushing flow rate from the exit pressure using a patient conductance and a coupling parameter modelling the degree of coupling between the patient interface and the patient's nares, and
subtracting the flushing flow rate from the device flow rate to estimate the breathing pattern of the patient.

Example 16

The respiratory therapy system of example 15, wherein the processor is a processor of a controller of the respiratory therapy device.

Example 17

The respiratory therapy system of example 15, wherein the processor is a processor of an external computing device with which the respiratory therapy device is in communication.

5.9 Glossary

For the purposes of the present technology disclosure, in certain forms of the present technology, one or more of the following definitions may apply. In other forms of the present technology, alternative definitions may apply.

5.9.1 General

Air: In certain forms of the present technology, air may be taken to mean atmospheric air, and in other forms of the present technology air may be taken to mean some other combination of breathable gases, e.g. atmospheric air enriched with oxygen.

Ambient: In certain forms of the present technology, the term ambient will be taken to mean (i) external of the treatment system or patient, and (ii) immediately surrounding the treatment system or patient.

Automatic Positive Airway Pressure (APAP) therapy: CPAP therapy in which the treatment pressure is automatically adjustable, e.g. from breath to breath, between minimum and maximum limits, depending on the presence or absence of indications of SDB events.

Continuous Positive Airway Pressure (CPAP) therapy: Positive pressure therapy in which the treatment pressure is approximately constant through a respiratory cycle of a patient. In some forms, the pressure at the entrance to the airways will be slightly higher during exhalation, and slightly lower during inhalation. In some forms, the pressure will vary between different respiratory cycles of the patient, for example, being increased in response to detection of indications of partial upper airway obstruction, and decreased in the absence of indications of partial upper airway obstruction.

Flow rate: The volume (or mass) of air delivered per unit time. Flow rate may refer to an instantaneous quantity. In some cases, a reference to flow rate will be a reference to a scalar quantity, namely a quantity having magnitude only. In other cases, a reference to flow rate will be a reference to a vector quantity, namely a quantity having both magnitude and direction. Flow rate may be given the symbol Q. 'Flow rate' is sometimes shortened to simply 'flow' or 'airflow'.

In the example of patient respiration, a flow rate may be nominally positive for the inspiratory portion of a breathing cycle of a patient, and hence negative for the expiratory portion of the breathing cycle of a patient. Device flow rate, Qd, is the flow rate of air leaving the RT device. Respiratory flow rate, Qr, is the flow rate of air that is received into the patient's respiratory system.

Flow therapy: Respiratory therapy comprising the delivery of a flow of air to an entrance to the airways at a controlled flow rate referred to as the treatment flow rate that is typically positive throughout the patient's breathing cycle.

Humidifier: The word humidifier will be taken to mean a humidifying apparatus constructed and arranged, or configured with a physical structure to be capable of providing a therapeutically beneficial amount of water ($H_2O$) vapour to a flow of air to ameliorate a medical respiratory condition of a patient.

Leak: The word leak will be taken to be an unintended flow of air. In one example, leak may occur as the result of an incomplete seal between a mask and a patient's face. In another example leak may occur in a swivel elbow to the ambient.

Patient: A person, whether or not they are suffering from a respiratory condition.

Pressure: Force per unit area. Pressure may be expressed in a range of units, including $cmH_2O$, $g\text{-}f/cm^2$ and hectopascal. 1 $cmH_2O$ is equal to 1 $g\text{-}f/cm^2$ and is approximately 0.98 hectopascal. In this specification, unless otherwise stated, pressure is given in units of $cmH_2O$.

Positive Pressure Therapy (RPT): Respiratory therapy comprising the application of a supply of air to an entrance to the airways at a controlled target pressure referred to as the treatment pressure that is nominally positive with respect to atmosphere throughout the patient's breathing cycle.

Ventilator: A mechanical device that provides pressure support to a patient to perform some or all of the work of breathing.

5.9.2 Respiratory Cycle

Apnea: According to some definitions, an apnea is said to have occurred when flow falls below a predetermined threshold for a duration, e.g. 10 seconds. An obstructive apnea will be said to have occurred when, despite patient effort, some obstruction of the airway does not allow air to flow. A central apnea will be said to have occurred when an apnea is detected that is due to a reduction in breathing effort, or the absence of breathing effort, despite the airway being patent. A mixed apnea occurs when a reduction or absence of breathing effort coincides with an obstructed airway.

Breathing rate: The rate of spontaneous respiration of a patient, usually measured in breaths per minute.

Duty cycle: The ratio of inhalation time, Ti to total breath time, Ttot.

Effort (breathing): The work done by a spontaneously breathing person attempting to breathe.

Expiratory portion of a breathing cycle: The period from the start of expiratory flow to the start of inspiratory flow.

Flow limitation: Flow limitation will be taken to be the state of affairs in a patient's respiration where an increase in effort by the patient does not give rise to a corresponding increase in flow. Where flow limitation occurs during an inspiratory portion of the breathing cycle it may be described as inspiratory flow limitation. Where flow limitation occurs during an expiratory portion of the breathing cycle it may be described as expiratory flow limitation.

Types of flow limited inspiratory waveforms:
(i) Flattened: Having a rise followed by a relatively flat portion, followed by a fall.
(ii) M-shaped: Having two local peaks, one at the leading edge, and one at the trailing edge, and a relatively flat portion between the two peaks.
(iii) Chair-shaped: Having a single local peak, the peak being at the leading edge, followed by a relatively flat portion.
(iv) Reverse-chair shaped: Having a relatively flat portion followed by single local peak, the peak being at the trailing edge.

Hypopnea: According to some definitions, a hypopnea is taken to be a reduction in flow, but not a cessation of flow. In one form, a hypopnea may be said to have occurred when there is a reduction in flow below a threshold rate for a duration. A central hypopnea will be said to have occurred when a hypopnea is detected that is due to a reduction in breathing effort. In one form in adults, either of the following may be regarded as being hypopneas:
(i) a 30% reduction in patient breathing for at least 10 seconds plus an associated 4% desaturation; or
(ii) a reduction in patient breathing (but less than 50%) for at least 10 seconds, with an associated desaturation of at least 3% or an arousal.

Hyperpnea: An increase in flow to a level higher than normal.

Inspiratory portion of a breathing cycle: The period from the start of inspiratory flow to the start of expiratory flow will be taken to be the inspiratory portion of a breathing cycle.

Patency (airway): The degree of the airway being open, or the extent to which the airway is open. A patent airway is open. Airway patency may be quantified, for example with a value of one (1) being patent, and a value of zero (0), being closed (obstructed).

Positive End-Expiratory Pressure (PEEP): The pressure above atmosphere in the lungs that exists at the end of expiration.

Peak flow rate (Qpeak): The maximum value of flow rate during the inspiratory portion of the respiratory flow waveform.

Respiratory flow rate, patient airflow rate, respiratory airflow rate (Qr): These terms may be understood to refer to an estimate of respiratory flow rate, as opposed to "true respiratory flow rate" or "true respiratory flow rate", which is the actual respiratory flow rate experienced by the patient, usually expressed in litres per minute.

Tidal volume (Vt): The volume of air inhaled or exhaled during normal breathing, when extra effort is not applied. In principle the inspiratory volume Vi (the volume of air inhaled) is equal to the expiratory volume Ve (the volume of air exhaled), and therefore a single tidal volume Vt may be defined as equal to either quantity. In practice the tidal volume Vt is estimated as some combination, e.g. the mean, of the inspiratory volume Vi and the expiratory volume Ve.

(inhalation) Time (Ti): The duration of the inspiratory portion of the respiratory flow rate waveform.

(exhalation) Time (Te): The duration of the expiratory portion of the respiratory flow rate waveform.

(total) Time (Ttot): The total duration between the start of one inspiratory portion of a respiratory flow rate waveform and the start of the following inspiratory portion of the respiratory flow rate waveform.

Typical recent ventilation: The value of ventilation around which recent values of ventilation Vent over some predetermined timescale tend to cluster, that is, a measure of the central tendency of the recent values of ventilation.

Upper airway obstruction (UAO): includes both partial and total upper airway obstruction. This may be associated with a state of flow limitation, in which the flow rate increases only slightly or may even decrease as the pressure difference across the upper airway increases (Starling resistor behaviour).

Ventilation (Vent): A measure of a rate of gas being exchanged by the patient's respiratory system. Measures of ventilation may include one or both of inspiratory and expiratory flow, per unit time. When expressed as a volume per minute, this quantity is often referred to as "minute ventilation". Minute ventilation is sometimes given simply as a volume, understood to be the volume per minute.

5.9.3 Ventilation

Adaptive Servo-Ventilator (ASV): A servo-ventilator that has a changeable, rather than fixed target ventilation. The changeable target ventilation may be learned from some characteristic of the patient, for example, a respiratory characteristic of the patient.

Backup rate: A parameter of a ventilator that establishes the minimum breathing rate (typically in number of breaths per minute) that the ventilator will deliver to the patient, if not triggered by spontaneous respiratory effort.

Cycled: The termination of a ventilator's inspiratory phase. When a ventilator delivers a breath to a spontaneously breathing patient, at the end of the inspiratory portion of the breathing cycle, the ventilator is said to be cycled to stop delivering the breath.

Expiratory positive airway pressure (EPAP): a base pressure, to which a pressure varying within the breath is added to produce the desired mask pressure which the ventilator will attempt to achieve at a given time.

End expiratory pressure (EEP): Desired mask pressure which the ventilator will attempt to achieve at the end of the expiratory portion of the breath.

Inspiratory positive airway pressure (IPAP): Maximum desired mask pressure which the ventilator will attempt to achieve during the inspiratory portion of the breath.

Pressure support: A number that is indicative of the increase in pressure during ventilator inspiration over that during ventilator expiration, and generally means the difference in pressure between the maximum value during inspiration and the base pressure (e.g., PS=IPAP−EPAP). In some contexts pressure support means the difference which the ventilator aims to achieve, rather than what it actually achieves.

Servo-ventilator: A ventilator that measures patient ventilation, has a target ventilation, and which adjusts the level of pressure support to bring the patient ventilation towards the target ventilation.

Spontaneous/Timed (S/T): A mode of a ventilator or other device that attempts to detect the initiation of a breath of a spontaneously breathing patient. If however, the device is unable to detect a breath within a predetermined period of time, the device will automatically initiate delivery of the breath.

Swing: Equivalent term to pressure support.

Triggered: When a ventilator delivers a breath of air to a spontaneously breathing patient, it is said to be triggered to do so at the initiation of the respiratory portion of the breathing cycle by the patient's efforts.

5.10 Other Remarks

A portion of the disclosure of this patent document contains material which is subject to copyright protection. The copyright owner has no objection to the facsimile reproduction by anyone of the patent document or the patent disclosure, as it appears in Patent Office patent files or records, but otherwise reserves all copyright rights whatsoever.

Unless the context clearly dictates otherwise and where a range of values is provided, it is understood that each intervening value, to the tenth of the unit of the lower limit, between the upper and lower limit of that range, and any other stated or intervening value in that stated range is encompassed within the technology. The upper and lower limits of these intervening ranges, which may be independently included in the intervening ranges, are also encompassed within the technology, subject to any specifically excluded limit in the stated range. Where the stated range includes one or both of the limits, ranges excluding either or both of those included limits are also included in the technology.

Furthermore, where a value or values are stated herein as being implemented as part of the technology, it is understood that such values may be approximated, unless otherwise stated, and such values may be utilized to any suitable significant digit to the extent that a practical technical implementation may permit or require it.

Unless defined otherwise, all technical and scientific terms used herein have the same meaning as commonly understood by one of ordinary skill in the art to which this technology belongs. Although any methods and materials similar or equivalent to those described herein can also be used in the practice or testing of the present technology, a limited number of the exemplary methods and materials are described herein.

When a particular material is identified as being used to construct a component, obvious alternative materials with similar properties may be used as a substitute. Furthermore, unless specified to the contrary, any and all components herein described are understood to be capable of being manufactured and, as such, may be manufactured together or separately.

It must be noted that as used herein and in the appended claims, the singular forms "a", "an", and "the" include their plural equivalents, unless the context clearly dictates otherwise.

All publications mentioned herein are incorporated herein by reference in their entirety to disclose and describe the methods and/or materials which are the subject of those publications. The publications discussed herein are provided solely for their disclosure prior to the filing date of the present application. Nothing herein is to be construed as an admission that the present technology is not entitled to antedate such publication by virtue of prior invention. Further, the dates of publication provided may be different from the actual publication dates, which may need to be independently confirmed.

The terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The subject headings used in the detailed description are included only for the ease of reference of the reader and should not be used to limit the subject matter found throughout the disclosure or the claims. The subject headings should not be used in construing the scope of the claims or the claim limitations.

Although the technology herein has been described with reference to particular examples, it is to be understood that these examples are merely illustrative of the principles and applications of the technology. In some instances, the terminology and symbols may imply specific details that are not required to practice the technology. For example, although the terms "first" and "second" may be used, unless otherwise specified, they are not intended to indicate any order but may be utilised to distinguish between distinct elements. Furthermore, although process steps in the methodologies may be described or illustrated in an order, such an ordering is not required. Those skilled in the art will recognize that such ordering may be modified and/or aspects thereof may be conducted concurrently or even synchronously.

It is therefore to be understood that numerous modifications may be made to the illustrative examples and that other arrangements may be devised without departing from the spirit and scope of the technology.

5.11 Reference Signs List

| | |
|---|---|
| patient | 1000 |
| curve | 1010 |
| curve | 1020 |
| curve | 1030 |
| method | 1100 |
| step | 1110 |
| step | 1120 |
| step | 1130 |
| method | 1200 |
| step | 1210 |
| step | 1220 |
| step | 1230 |
| step | 1240 |
| top graph | 1310 |
| second graph | 1320 |
| third graph | 1330 |
| bottom graph | 1340 |
| patient interface | 3000 |
| seal - forming structure | 3100 |
| plenum chamber | 3200 |
| structure | 3300 |
| vent | 3400 |
| connection port | 3600 |

-continued

| | |
|---|---|
| forehead support | 3700 |
| nasal cannula | 3800 |
| prong | 3810a |
| prong | 3810b |
| lumen | 3820a |
| lumen | 3820b |
| RT device | 4000 |
| external housing | 4010 |
| upper portion | 4012 |
| portion | 4014 |
| panel | 4015 |
| chassis | 4016 |
| handle | 4018 |
| pneumatic block | 4020 |
| air filter | 4110 |
| inlet air filter | 4112 |
| outlet air filter | 4114 |
| mufflers | 4120 |
| inlet muffler | 4122 |
| outlet muffler | 4124 |
| pressure generator | 4140 |
| blower | 4142 |
| motor | 4144 |
| anti-spill back valve | 4160 |
| air circuit | 4170 |
| electrical components | 4200 |
| PCBA | 4202 |
| power supply | 4210 |
| input devices | 4220 |
| central controller | 4230 |
| clock | 4232 |
| therapy device controller | 4240 |
| protection circuits | 4250 |
| memory | 4260 |
| transducers | 4270 |
| pressure sensor | 4272 |
| flow rate sensor | 4274 |
| motor speed transducer | 4276 |
| data communication interface | 4280 |
| remote external communication network | 4282 |
| local external communication network | 4284 |
| remote external device | 4286 |
| local external device | 4288 |
| output device | 4290 |
| display driver | 4292 |
| display | 4294 |
| algorithms | 4300 |
| pre-processing module | 4310 |
| exit pressure estimation algorithm | 4312 |
| respiratory flow rate estimation algorithm | 4316 |
| coupling parameter estimation algorithm | 4318 |
| therapy engine module | 4320 |
| phase determination algorithm | 4321 |
| ventilation determination algorithm | 4323 |
| inspiratory flow limitation determination algorithm | 4324 |
| apnea/hypopnea detection algorithm | 4325 |
| periodic breathing detection algorithm | 4326 |
| therapy parameter determination algorithm | 4329 |
| therapy control module | 4330 |
| fault condition detection methods | 4340 |
| reporting module | 4350 |
| humidifier | 5000 |
| humidifier inlet | 5002 |
| humidifier outlet | 5004 |
| humidifier base | 5006 |
| humidifier reservoir | 5110 |
| humidifier reservoir dock | 5130 |
| heating element | 5240 |
| naris | 8010 |
| cannula prong | 8020 |
| curve | 9010 |
| curve | 9020 |
| curve | 9030 |

The invention claimed is:

1. A method in a controller for computing an estimate of a breathing pattern of a patient, the method comprising:
accessing a device flow rate signal representative of a flow rate of a flow of air generated by a respiratory therapy device configured for providing a flow therapy via an unsealed patient interface;
accessing a device pressure signal representative of a pressure of the flow of air generated by the respiratory therapy device;
computing an estimate of an exit pressure representative of a pressure of the flow of air just outside an orifice of the unsealed patient interface with a first function of (a) the device pressure signal, (b) the device flow rate signal, and (c) a device conductance;
computing an estimate of a flushing flow rate from the estimated exit pressure with a second function of (a) a patient conductance, and (b) a coupling parameter that characterizes a degree of coupling between the patient interface and the patient's nares;
computing the estimate of the breathing pattern of the patient with a third function of (a) the flushing flow rate, and (b) the device flow rate signal; and
controlling, by the controller, an operation of the respiratory therapy device based on the computed estimate of a flushing flow rate.

2. The method of claim 1, wherein the patient conductance is an ideal patient conductance.

3. The method of claim 2 wherein the second function for estimating the flushing flow rate comprises a ratio of the ideal patient conductance and the coupling parameter.

4. The method of claim 3, further comprising determining the ideal patient conductance in a calibration process.

5. The method of claim 1, wherein the first function for estimating the exit pressure comprises a value of a density of the flow of air being generated by the respiratory therapy device.

6. The method of claim 1, wherein the second function for estimating the flushing flow rate comprises a value of a density of the flow of air being generated by the respiratory therapy device.

7. The method of claim 1, wherein the second function for estimating the flushing flow rate comprises scaling the patient conductance by a fluid dynamics asymmetry coefficient if the estimate of the exit pressure is positive.

8. The method of claim 1, wherein the second function for estimating the flushing flow rate comprises scaling, with a scaling factor, the flushing flow rate if the exit pressure is positive, wherein the scaling factor is dependent on the device flow rate signal.

9. The method of claim 8, wherein the scaling factor further depends on a fluid dynamics uncoupling coefficient that scales the device flow rate.

10. The method of claim 9, wherein the fluid dynamics uncoupling coefficient is proportional to the coupling parameter.

11. The method of claim 1, further comprising computing an estimate of the coupling parameter based on the estimated breathing pattern of the patient.

12. The method of claim 11, wherein computing the estimate of the coupling parameter comprises applying a proportional-integral controller.

13. The method of claim 12, wherein the proportional-integral controller applies a correction to the coupling parameter that is computed from a lowpass filtered version of a signal representing the estimated breathing pattern.

14. The method of claim 11, further comprising generating an output comprising the estimated coupling parameter as a continuously-valued indicator of the usage of the flow therapy by the patient.

15. The method of claim 1, further comprising:
generating, with a flow rate sensor coupled to the controller, the device flow rate signal; and
generating, with a pressure sensor coupled to the controller, the device pressure signal.

16. The method of claim 1, wherein the operation comprises an adjustment to a treatment flow rate for controlling generation of the flow of air.

17. The method of claim 1, further comprising controlling, by the controller, an operation of the respiratory therapy device based on the computed estimate of the breathing pattern of the patient.

18. The method of claim 17 wherein the operation comprises an adjustment to a treatment flow rate for controlling generation of the flow of air.

19. The method of claim 1, further comprising detecting, by the controller, a respiratory event based on an assessment of the computed estimate of the breathing pattern.

20. A non-transitory processor-readable medium, having stored thereon processor-executable instructions which, when executed by one or more processors, cause the one or more processors to compute an estimate of a breathing pattern of a patient, the processor-executable instructions comprising:
instructions to access a device flow rate signal representative of a flow rate of a flow of air generated by a respiratory therapy device configured for providing a flow therapy via an unsealed patient interface;
instructions to access a device pressure signal representative of a pressure of the flow of air generated by the respiratory therapy device;
instructions to compute an estimate of an exit pressure representative of a pressure of the flow of air just outside an orifice of the unsealed patient interface with a first function of (a) the device pressure signal, (b) the device flow rate signal, and (c) a device conductance;
instructions to compute an estimate of a flushing flow rate from the estimated exit pressure with a second function of (a) a patient conductance, and (b) a coupling parameter that characterizes a degree of coupling between the patient interface and the patient's nares; and
instructions to compute the estimate of the breathing pattern of the patient with a third function of (a) the flushing flow rate, and (b) the device flow rate signal; and
instructions to control an operation of the respiratory therapy device based on the computed estimate of a flushing flow rate.

21. A respiratory therapy system comprising:
a respiratory therapy device comprising a blower configured to generate a flow of air at a controlled flow rate via an unsealed patient interface;
a sensor configured to generate a device flow rate signal representative of a flow rate of the flow of air generated by the respiratory therapy device;
a sensor configured to generate a device pressure signal representative of a pressure of the flow of air generated by the respiratory therapy device;
a memory; and
one or more processors configured to:
compute an estimate of an exit pressure representative of a pressure of the flow of air just outside an orifice of the unsealed patient interface as a function of (a) the device pressure signal, (b) the device flow rate signal, and (c) a device conductance,
compute an estimate of a flushing flow rate as a function of (a) the estimated exit pressure, (b) a patient conductance, and (c) a coupling parameter that characterizes a degree of coupling between the patient interface and the patient's nares,
compute an estimate of a breathing pattern of the patient as a function of (a) the flushing flow rate, and (b) the device flow rate signal, and
control an operation of the respiratory therapy system based on the computed estimate of a flushing flow rate.

22. The respiratory therapy system of claim 21, wherein the one or more processors includes a processor of a controller of the respiratory therapy device.

23. The respiratory therapy system of claim 21, wherein the one or more processors includes a processor of an external computing device with which the respiratory therapy device is in communication.

24. A method for generating a signal representing an estimate of a breathing pattern of a patient using a flow therapy device with an unsealed patient interface, the method comprising:
computing an estimate of the breathing pattern of the patient as a function of (a) a device flow rate signal; (b) a device pressure signal; (c) a device conductance; (d) a patient conductance; and (e) a coupling parameter that characterizes a degree of coupling between the patient interface and the patient's nares.

25. The method of claim 24 wherein the computing comprises computing an estimate of an exit pressure representative of a pressure of a flow of air generated by the flow therapy device just outside an orifice of the unsealed patient interface.

26. The method of claim 25 wherein the computing comprises computing an estimate of a flushing flow rate from the estimated exit pressure.

27. A non-transitory processor-readable medium, having stored thereon processor-executable instructions which, when executed by one or more processors, cause the one or more processors to compute an estimate of a breathing pattern of a patient, the processor-executable instructions configured to compute an estimate of the breathing pattern of the patient as a function of (a) a device flow rate signal; (b) a device pressure signal; (c) a device conductance; (d) a patient conductance; and (e) a coupling parameter that characterizes a degree of coupling between the patient interface and the patient's nares; and configured to control an operation of a respiratory therapy system based on the computed estimate of a flushing flow rate.

28. A respiratory therapy system comprising:
a respiratory therapy device comprising a blower configured to generate a flow of air at a controlled flow rate via an unsealed patient interface;
a sensor configured to generate a device flow rate signal representative of a flow rate of the flow of air generated by the respiratory therapy device;
a sensor configured to generate a device pressure signal representative of a pressure of the flow of air generated by the respiratory therapy device; and
a controller configured to generate a breathing pattern signal representing an estimate of a breathing pattern of a patient receiving a flow therapy from the respiratory therapy device, wherein the controller is configured to generate the breathing pattern signal as a function of (a) the device flow rate signal; (b) the device pressure signal; (c) a device conductance; (d) a patient conductance; and (e) a coupling parameter that characterizes a degree of coupling between the unsealed patient interface and the patient's nares; and wherein the controller is configured to control an operation of the respiratory therapy device based on the breathing pattern signal.

29. The respiratory therapy system of claim 28 wherein to generate the breathing pattern signal, the controller is configured to compute an estimate of an exit pressure representative of a pressure of the flow of air just outside an orifice of the unsealed patient interface.

30. The respiratory therapy system of claim 29 wherein to generate the breathing pattern signal, the controller is configured to compute an estimate of a flushing flow rate from the estimated exit pressure.

* * * * *